US010983578B2

(12) United States Patent
Nicholson et al.

(10) Patent No.: US 10,983,578 B2
(45) Date of Patent: Apr. 20, 2021

(54) SYSTEMS AND METHODS FOR CONFIGURING A POWER DISTRIBUTION UNIT

(71) Applicant: Server Technology, Inc., Reno, NV (US)

(72) Inventors: Calvin Nicholson, Reno, NV (US); Michael Gordon, Reno, NV (US)

(73) Assignee: Server Technology, Inc., Reno, NV (US)

( * ) Notice: Subject to any disclaimer, the term of this patent is extended or adjusted under 35 U.S.C. 154(b) by 498 days.

(21) Appl. No.: 15/617,336

(22) Filed: Jun. 8, 2017

(65) Prior Publication Data
US 2017/0269663 A1 Sep. 21, 2017

Related U.S. Application Data

(63) Continuation of application No. 13/371,334, filed on Feb. 10, 2012, now Pat. No. 9,703,342.

(51) Int. Cl.
G06F 1/26 (2006.01)
H04L 12/10 (2006.01)
(52) U.S. Cl.
CPC .............. G06F 1/266 (2013.01); H04L 12/10 (2013.01)
(58) Field of Classification Search
CPC .................................. G06F 1/266; H04L 12/10
See application file for complete search history.

(56) References Cited

U.S. PATENT DOCUMENTS

| 4,051,326 A | 9/1977 | Badagnani et al. |
| 4,101,878 A | 7/1978 | Shimizu et al. |
| 4,206,444 A | 6/1980 | Ferlan |
| 4,356,545 A | 10/1982 | West |

(Continued)

FOREIGN PATENT DOCUMENTS

| CN | 20211340 U | 1/2012 |
| JP | 2006114997 A | 4/2006 |

(Continued)

OTHER PUBLICATIONS

Korean Intellectual Property Office, "Notification of Transmittal of the International Search Report and the Written Opinion of the International Searching Authority, or the Declaration"; PCT/US2013/025606; dated May 15, 2013; 10 pp.

(Continued)

Primary Examiner — Kris E Mackes
Assistant Examiner — Lin Lin M Htay
(74) Attorney, Agent, or Firm — Perkins Coie LLP

(57) ABSTRACT

Methods, systems, and devices are described for configuration of multiple power distribution units (PDUs) in an efficient manner. Power distribution units may be discovered on a network, and automatically configured according to a configuration defined for a particular location. A location may be, for example, a geographical region, a data center, a zone within a data center, a cabinet, or an individual PDU. All PDUs associated with a particular location may be provided with a common configuration file that defines operating parameters for the PDUs. In such a manner, a user may simply connect the PDU to the network, with the appropriate configuration provided without additional involvement of the user.

16 Claims, 19 Drawing Sheets

(56) References Cited

U.S. PATENT DOCUMENTS

| | | |
|---|---|---|
| 4,442,319 A | 4/1984 | Treidl |
| 4,495,568 A | 1/1985 | Gilbert et al. |
| 4,611,289 A | 9/1986 | Coppola |
| 4,647,721 A | 3/1987 | Busam et al. |
| 4,701,946 A | 10/1987 | Oliva et al. |
| 4,709,318 A | 11/1987 | Gephart et al. |
| 4,729,375 A | 3/1988 | Jegers et al. |
| 4,777,607 A | 10/1988 | Maury et al. |
| 4,780,714 A | 10/1988 | Moustakas et al. |
| 4,814,941 A | 3/1989 | Speet et al. |
| 4,937,561 A | 6/1990 | Sasaki et al. |
| 5,164,609 A | 11/1992 | Poppe et al. |
| 5,198,806 A | 3/1993 | Lord |
| 5,319,571 A | 6/1994 | Langer et al. |
| 5,359,540 A | 10/1994 | Ortiz |
| 5,374,922 A | 12/1994 | Ebersohl |
| 5,381,554 A | 1/1995 | Langer et al. |
| 5,410,713 A | 4/1995 | White et al. |
| 5,412,645 A | 5/1995 | Younkin et al. |
| 5,424,903 A | 6/1995 | Schreiber |
| 5,436,510 A | 7/1995 | Gilbert |
| 5,481,730 A | 1/1996 | Brown et al. |
| 5,485,576 A | 1/1996 | Fee et al. |
| 5,495,607 A | 2/1996 | Pisello et al. |
| 5,506,573 A | 4/1996 | Ewing et al. |
| 5,506,790 A | 4/1996 | Nguyen |
| 5,534,734 A | 7/1996 | Pugh et al. |
| 5,537,462 A | 7/1996 | Utter et al. |
| 5,561,769 A | 10/1996 | Kumar et al. |
| 5,563,455 A | 10/1996 | Cheng |
| 5,579,201 A | 11/1996 | Karageozian |
| 5,585,678 A | 12/1996 | Dijk et al. |
| 5,596,628 A | 1/1997 | Klein |
| 5,652,893 A | 7/1997 | Ben-Meir et al. |
| 5,687,079 A | 11/1997 | Bauer et al. |
| 5,717,934 A | 2/1998 | Pitt et al. |
| 5,721,934 A | 2/1998 | Scheurich |
| 5,761,084 A | 6/1998 | Edwards |
| 5,781,434 A | 7/1998 | Tobita et al. |
| 5,835,700 A | 11/1998 | Carbonneau |
| 5,862,391 A | 1/1999 | Salas et al. |
| 5,949,974 A | 9/1999 | Ewing et al. |
| 6,002,340 A | 12/1999 | Smith |
| 6,029,092 A | 2/2000 | Stein |
| 6,046,513 A | 4/2000 | Jouper et al. |
| 6,266,713 B1 | 7/2001 | Karanam et al. |
| 6,379,164 B1 | 4/2002 | Cash, Jr. |
| 6,408,395 B1 | 6/2002 | Sugahara et al. |
| 6,445,087 B1 | 9/2002 | Wang et al. |
| 6,476,729 B1 | 11/2002 | Liu |
| 6,480,964 B1 | 11/2002 | Oh |
| 6,496,103 B1 | 12/2002 | Weiss et al. |
| 6,507,273 B1 | 1/2003 | Chang et al. |
| 6,519,509 B1 | 2/2003 | Nierlich et al. |
| 6,557,170 B1 | 4/2003 | Wilder et al. |
| 6,711,163 B1 | 3/2004 | Reid et al. |
| 6,715,088 B1 | 3/2004 | Togawa |
| 6,741,442 B1 | 5/2004 | McNally et al. |
| 7,171,542 B1 | 1/2007 | Alfano et al. |
| 7,579,711 B2 | 8/2009 | Menas et al. |
| 7,761,325 B2 | 7/2010 | Hussain |
| 7,774,443 B2 | 8/2010 | Ewing et al. |
| 8,110,942 B2 | 2/2012 | Ensinger |
| 8,321,163 B2 | 11/2012 | Ewing et al. |
| 8,494,661 B2 | 7/2013 | Ewing et al. |
| 8,674,823 B1 | 3/2014 | Contario et al. |
| 2002/0007463 A1 | 1/2002 | Fung |
| 2002/0052940 A1 | 5/2002 | Myers et al. |
| 2003/0200473 A1 | 10/2003 | Fung |
| 2005/0203987 A1 | 9/2005 | Ewing et al. |
| 2005/0223090 A1* | 10/2005 | Ewing ............ G06F 1/3246 709/223 |
| 2006/0031453 A1 | 2/2006 | Ewing et al. |
| 2006/0031454 A1 | 2/2006 | Ewing et al. |
| 2006/0072531 A1 | 4/2006 | Ewing et al. |
| 2006/0186739 A1 | 8/2006 | Grolnic et al. |
| 2007/0016664 A1 | 1/2007 | Ewing et al. |
| 2007/0050443 A1 | 3/2007 | Ewing et al. |
| 2007/0130243 A1 | 6/2007 | Ewing et al. |
| 2007/0136453 A1 | 6/2007 | Ewing et al. |
| 2007/0140238 A1 | 6/2007 | Ewing et al. |
| 2009/0219145 A1* | 9/2009 | Wong ............ H04W 4/029 340/286.02 |
| 2009/0234512 A1 | 9/2009 | Ewing et al. |
| 2009/0236909 A1 | 9/2009 | Aldag et al. |
| 2010/0005331 A1* | 1/2010 | Somasundaram ........ G06F 1/26 713/340 |
| 2010/0007473 A1 | 1/2010 | Fadell |
| 2010/0211669 A1 | 8/2010 | Dalgas et al. |
| 2010/0328849 A1 | 12/2010 | Ewing et al. |
| 2011/0167280 A1 | 7/2011 | Ewing et al. |
| 2011/0187193 A1 | 8/2011 | Pan et al. |
| 2011/0291813 A1 | 12/2011 | Jansma |
| 2011/0320832 A1 | 12/2011 | Boss et al. |
| 2012/0095610 A1 | 4/2012 | Chapel et al. |
| 2012/0173177 A1 | 7/2012 | Nishiyama et al. |
| 2012/0181869 A1 | 7/2012 | Chapel et al. |
| 2012/0194146 A1 | 8/2012 | Longacre |
| 2012/0306661 A1 | 12/2012 | Xue et al. |
| 2012/0317428 A1 | 12/2012 | Liu et al. |
| 2015/0236453 A1 | 8/2015 | Magee, Jr. |

FOREIGN PATENT DOCUMENTS

| | | |
|---|---|---|
| JP | 2007265166 A | 10/2007 |
| JP | 2011508352 A | 3/2011 |
| KR | 1020080019938 A | 3/2008 |
| WO | WO-1993010615 A1 | 5/1993 |

OTHER PUBLICATIONS

Complaint for Patent Infringement, *Server Technology, Inc. v. American Power Conversion Corporation*, Case No. 3:06-CV-.sub.--, 61 pp. (Dec. 18, 2006).

First Amended Complaint for Patent Infringement, *Server Technology, Inc. v. American Power Conversion Corporation*, Case No. 3:06-CV-00698-LRH-VPC, 83 pp. (Feb. 20, 2007).

Defendants Answer and Affirmative Defenses to Plaintiffs Complaint for Patent Infringement; Counterclaims for Declaratory Judgment of Patent Noninfringement and Patent Invalidity; and Patent Infringement; Demand for Jury Trial, *Server Technology, Inc. v. American Power Conversion Corporation*, Case No. 3:06-CV-00698-LRH-VPC, 37 pp. (Apr. 2, 2007).

Defendants First Amended Answer and Affirmative Defenses to Plaintiff's Complaint for Patent Infringement; Counterclaims for Declaratory Judgment of Patent Noninfringement and Patent Invalidity; and Patent Infringement, Case No. 3:06-CV-00698-LRH-(VPC), 36 pp. (Apr. 13, 2007).

Plaintiff Server Technology Inc.'s Reply to Defendant's First Amended Counterclaims for Declaratory Judgment of Patent Noninfringement and Patent Invalidity; and Patent Infringement; Jury Demand, *Server Technology, Inc. v. American Power Conversion Corporation*, Case No. 3:06-CV-00698-LRH-VPC, 8 pp. (Apr. 30, 2007).

Server Technology, Inc.'s Fifth Amended Disclosure of Asserted Claims and Preliminary Infringement Contentions With Exhibits, *Server Technology, Inc. v. American Power Conversion Corporation*, Case No. 3:06-CV-00698-LRH-VPC, 30 pp. (Sep. 29, 2007).

American Power Conversion Corporation's Preliminary Invalidity Contentions, *Server Technology, Inc. v. American Power Conversion Corporation*, Case No. 3:06-CV-00698-LRH-VPC, 89 pp. (Oct. 12, 2007).

American Power Conversion Corporation's Preliminary Claim Constructions and Extrinsic Evidence (Patent Local Rule 4-2), *Server Technology, Inc. v. American Power Conversion Corporation*, Case No. 3:06-CV-00698-LRH-VPC, 8 pp. (Jan. 21, 2008).

Plaintiff and Counterdefendant Server Technology, Inc.'s Preliminary Claim Constructions and Extrinsic Evidence (Patent Local Rule 4-2), *Server Technology, Inc. v. American Power Conversion Corporation*, Case No. 3:06-CV-00698-LRH-VPC, 7 pp. (Jan. 29, 2008).

(56) References Cited

OTHER PUBLICATIONS

Joint Claim Construction Chart and Prehearing Statement (Patent Rule 4.3), *Server Technology, Inc. v. American Power Conversion Corporation*, Case No. 3:06-CV-00698-LRH-VPC, 77 pp. (Feb. 22, 2008).
Plaintiff and Counterdefendant Server Technology, Inc.'s Opening Claim Construction Brief, *Server Technology, Inc. v. American Power Conversion Corporation*, Case No. 3:06-CV-00698-LRH-VPC, 206 pp. (May 19, 2008).
American Power Conversion Corp.'s Response to Plaintiff and Counterdefendant Server Technology, Inc.'s Opening Claim Construction Brief, *Server Technology, Inc. v. American Power Conversion Corporation*, Case No. 3:06-CV-00698-LRH-VPC, 279 pp. (Jul. 25, 2008).
Plaintiff and Counterdefendant Server Technology, Inc.'s Reply to APC's Response to STI's Opening Claim Construction Brief, *Server Technology, Inc. v. American Power Conversion Corporation*, Case No. 3:06-CV-00698-LRH-VPC, 287 pp. (Aug. 8, 2008).
Continuation of Server Technology's Reply to American Power Conversion Corp.'s Response to Opening Claim Construction Brief, *Server Technology, Inc. v. American Power Conversion Corporation*, Case No. 3:06-CV-00698-LRH-VPC, 94 pp. (Aug. 11, 2008).
Server Technology's Proposed Order on Claim Construction, *Server Technology, Inc. v. American Power Conversion Corporation*, Case No. 3:06-CV-00698-LRH-VPC, 22 pp. (Dec. 5, 2008).
American Power Conversion Corp.'s Proposed Order on Claim Construction, *Server Technology, Inc. v. American Power Conversion Corporation*, Case No. 3:06-CV-00698-LRH-VPC, 24 pp. (Dec. 5, 2008).
American Power Conversion Corporation's Response to Server Technology's Proposed Order on Claim Construction, *Server Technology, Inc. v. American Power Conversion Corporation*, Case No. 3:06-CV-00698-LRH-VPC, 24 pp. (Jan. 5, 2009).
Server Technology's Response in Opposition to APC's Proposed Order on Claim Construction, *Server Technology, Inc. v. American Power Conversion Corporation*, Case No. 3:06-CV-00698-LRH-VPC, 23 pp. (Jan. 6, 2009).
Server Technology's Corrected Response in Opposition to APC's Proposed Order on Claim Construction, *Server Technology, Inc. v. American Power Conversion Corporation*, Case No. 3:06-CV-00698-LRH-VPC, 23 pp. (Jan. 8, 2009).
American Power Conversion Corporation's Reply Regarding Server Tech.'s Proposed Order on Claim Construction, *Server Technology, Inc. v. American Power Conversion Corporation*, Case No. 3:06-CV-00698-LRH-VPC, 13 pp. (Jan. 12, 2009).
Server Technology's Reply to APC's Response to Server Technology's Proposed Order on Claim Construction, *Server Technology, Inc. v. American Power Conversion Corporation*, Case No. 3:06-CV-00698-LRH-VPC, 13 pp. (Jan. 12, 2009).
American Power Conversion Corporation's Motion for Leave to File a Surreply to Server Tech.'s Reply Brief on Claim Construction, *Server Technology, Inc. v. American Power Conversion Corporation*, Case No. 3:06-CV-00698-LRH-VPC, 3 pp. (Jan. 22, 2009).
American Power Conversion Corporation's Surreply to Server Tech.'s Reply Brief on Claim Construction, *Server Technology, Inc. v. American Power Conversion Corporation*, Case No. 3:06-CV-00698-LRH-VPC, 5 pp. (Jan. 22, 2009).
Server Technology's Response in Opposition to APC's Motion to File a Surreply to Server Technology's Reply Brief on Claim Construction, *Server Technology, Inc. v. American Power Conversion Corporation*, Case No. 3:06-CV-00698-LRH-VPC, 9 pp. (Feb. 7, 2009).
Claim Construction Order, *Server Technology, Inc. v. American Power Conversion Corporation*, Case No. 3:06-CV-00698-LRH-VPC, 41 pp. (Apr. 19, 2010).
Server Technology, Inc.'s Motion for Leave to File Instanter Second Amended Complaint, *Server Technology, Inc. v. American Power Conversion Corporation*, Case No. 3:06-CV-00698-LRH-VPC, 112 pp. (May 5, 2010).
APC's Answer, Affirmative Defenses, and Counterclaims to STI's Second Amended Complaint for Patent Infringement and Demand for Jury Trial, *Server Technology, Inc. v. American Power Conversion Corporation*, Case No. 3:06-CV-00698-LRH-VPC, 22 pp. (Oct. 8, 2010).
APC's Motion for Summary Judgment of Non-Infringement and Invalidity. *Server Technology, Inc. v. American Power Conversion Corporation*. Case No. 3:06-CV-00698-LRH-VPC. 2 pp. (Nov. 4, 2010).
APC'S Memorandum of Law in Support of Its Motion for Summary Judgment of Non-Infringement and Invalidity and Exhibits 1-21; *Server Technology, Inc. v. American Power Conversion Corporation*, Case No. 3:06-CV-00698-LRH-VPC, 708 pp. (Nov. 4, 2010).
APC'S Amended Answer, Affirmative Defenses, and Counterclaims to STI'S Second Amended Complaint for Patent Infringement; Demand for Jury Trial and Exhibits A-F, *Server Technology, Inc. v. American Power Conversion Corporation*, Case No. 3:06-CV-00698-LRH-VPC, 88 pp. (Jan. 18, 2011).
Plaintiff Server Technology Inc.'s Answer to Amended Counterclaims; Jury Demand, *Server Technology, Inc. v. American Power Conversion Corporation*, Case No. 3:06-CV-00698-LRH-VPC, 23 pp. (Feb. 1, 2011).
American Power Conversion Corporation's Final Invalidity Contentions and Exhibits A-D, *Server Technology, Inc. v. American Power Conversion Corporation*, Case No. 3:06-CV-00698-LRH-VPC, 165 pp. (Feb. 4, 2011).
Amended Complaint for Patent Infringement, *Server Technology, Inc. v. American Power Conversion Corporation*; Case No. 3:11-CV-00068-ECR-(RAM); 45 pp.; Apr. 28, 2011.
American Power Conversion Corporation's Answer, Defenses and Counterclaims to Plaintiffs Amended Complaint, *Server Technology, Inc. v. American Power Conversion Corporation*; Case No. 3:11-CV-00068-ECR-(RAM); 10 pp.; May 12, 2011.
"Expert Report of Kc Mares" *Server Technology, Inc. v. American Power Conversion Corporation*, Case No. 3:06-CV-00698-LRH-VPC, 204 pp. (May 27, 2011).
"Expert Witness Report of Douglas Bors, PE" *Server Technology, Inc. v. American Power Conversion Corporation*, Case No. 3:06-CV-00698-LRH-VPC, 87 pp. (May 27, 2011).
"Expert Witness Report of Dr. Mark Horenstein Regarding Invalidity of STI's Patents" *Server Technology, Inc. v. American Power Conversion Corporation*, Case No. 3:06-CV-00698-LRH-VPC, 137 pp. (May 27, 2011).
"Expert Report of B. Michael Aucoin, D. Engr., PE, PMP consolidated rebuttal of APC's Expert Invalidity Reports" *Server Technology, Inc. v. American Power Conversion Corporation*, Case No. 3:06-CV-00698-LRH-VPC, 152 pp. (Jun. 29, 2011).
"Expert Report of KC Mares (In Rebuttal to APC'S Invalidity Reports)" *Server Technology, Inc. v. American Power Conversion Corporation*, Case No. 3:06-CV-00698-LRH-VPC, 33 pp. (Jun. 29, 2011).
Rebuttal Expert Witness Report of Douglas Bors, PE, *Server Technology, Inc. v. American Power Conversion Corporation*, Case No. 3:06-CV-00698-LRH-VPC, 19 pp. (Jun. 29, 2011).
American Power Conversion Motion for Summary Judgment, *Server Technology, Inc. v. American Power Conversion Corporation*; Case No. 3:06-CV-00698-LRH-VPC; 4 pp.; (Aug. 30, 2011).
APC's Memorandum of Law in Support of Its Motion for Summary Judgment and Exhibits *Server Technology, Inc. v. American Power Conversion Corporation*; Case No. 3:06-cv-00698-LRH-VPC; 75 pp.; (Aug. 30, 2011).
STI's Response to APC's Motion for Summary Judgment *Server Technology, Inc. v. American Power Conversion Corporation*; Case No. 3:06-cv-00698-LRH-VPC; 85 pp.; Sep. 26, 2011.
APC's Reply in Support of Summary Judgment and Exhibits *Server Technology, Inc. v. American Power Conversion Corporation*; Case No. 3:06-CV-00698-LRH-VPC; 90 pp.; Oct. 14, 2011.
American Power Conversion Corporation'S Initial Disclosure of Noninfringement, Invalidity, and Unenforceability Contentions, *Server Technology, Inc. v. American Power Conversion Corporation*; Case No. 3:11-CV-00068-ECR-(RAM); 26 pp.; Dec. 16, 2011.
Exhibits A1 to A3 of American Power Conversion Corporation's Initial Disclosure of Noninfringement, Invalidity, and Unenforce-

(56) References Cited

OTHER PUBLICATIONS ability Contentions, *Server Technology, Inc. v. American Power Conversion Corporation*; Case No. 3:11-CV-00068-ECR-(RAM); 15 pp.; Dec. 16, 2011.
Second Amended Complaint for Patent Infringement, *Server Technology, Inc. v. American Power Conversion Corporation*; Case No. 3:11-CV-00068-ECR-(RAM); 99 pp.; Dec. 19, 2011.
American Power Conversion Corporation's Answer, Defenses and Counterclaims to Plaintiff's Second Amended Complaint, *Server Technology, Inc. v. American Power Conversion Corporation*; Case No. 3:11-CV-00068-ECR-(RAM); 17 pp.; Jan. 9, 2012.
American Power Conversion Corporation; "Notice of Second Office Action in Reexamination Proceedings," *Server Technology, Inc. v. American Power Conversion Corporation*; Case No. 3:06-CV-00698-LRH-VPC; 87 pp. (Apr. 10, 2012).
Server Technology, Inc.; "STI's Response to APC's Notice of Second Office Action in Reexamination Proceedings," *Server Technology, Inc. v. American Power Conversion Corporation*; Case No. 3:06-CV-00698-LRH-VPC; Apr. 18, 2012; 5 pp.
Complaint for Patent Infringement, *Server Technology, Inc. v. American Power Conversion Corporation*, Case No. 3:11-CV-00068-LRH-WGC; In the United States District Court, District of Nevada; 85 pp.; Jan. 28, 2011.
Amended Complaint for Patent Infringement, *Server Technology, Inc. v. American Power Conversion Corporation*, Case No. 3:11-CV-00068-LRH-WGC; In the United States District Court, District of Nevada;45 pp.; Apr. 28, 2011.
Second Amended Complaint for Patent Infringement, *Server Technology, Inc. v. American Power Conversion Corporation*, Case No. 3:11-CV-00068-LRH-WGC;In the United States District Court, District of Nevada; 99 pp.; Dec. 19, 2011.
Joint Claim Construction and Prehearing Statement, *Server Technology, Inc. v. American Power Conversion Corporation*, Case No. 3:11-CV-00068-LRH-WGC;In the United States District Court, District of Nevada; 90 pp.; Mar. 14, 2012.
STI's Opening Claim Construction Brief, *Server Technology, Inc. v. American Power Conversion Corporation*, Case No. 3:11-CV-00068-LRH-WGC; In the United States District Court, District of Nevada;246 pp.; May 14, 2012.
Notice of Filing of STI's Corrected Opening Claim Construction Brief, *Server Technology, Inc. v. American Power Conversion Corporation*, Case No. 3:11-CV-00068-LRH-WGC; In the United States District Court, District of Nevada; 67 pp.; May 18, 2012.
American Power Conversion's Claim Construction Brief, *Server Technology, Inc. v. American Power Conversion Corporation*, Case No. 3:11-CV-00068-LRH-WGC; In the United States District Court, District of Nevada; 132 pp.; Jun. 11, 2012.
Declaration of Kristopher R. Kiel in Support of American Power Conversion's Claim Construction Brief, *Server Technology, Inc. v. American Power Conversion Corporation*, Case No. 3:11-CV-00068-LRH-WGC; In the United States District Court, District of Nevada; 779 pp.; Jun. 11, 2012.
STI's Reply Claim Construction Brief; *Server Technology, Inc. v. American Power Conversion Corporation*, Case No. 3:11-CV-00068-LRH-WGC; In the United States District Court, District of Nevada; 75 pp.; Jul. 2, 2012.
Detailed Request for Inter Partes Reexamination Under 35 U.S.C. §§311-318 and 37 C.F.R. §1.902 et Seq. dated Nov. 12, 2010; Reexamination Control No. 95/001,485; 60 pp.
Order Granting Request for Inter Partes Reexamination dated Jan. 15, 2011; Reexamination Control No. 95/001,485; USPTO.
Office Action dated Jan. 15, 2011; Reexamination Control No. 95/001,485; USPTO.
Patent Owner's Revised Response to Non-Final Office Action, and Exhibits, Reexamination Control No. 95/001,485; 615 pp.; dated Jun. 20, 2011.
Requestor's Revised Comments on Office Action dated Jan. 15, 2011 and Patent Owner's Revised Response, and Exhibits, Reexamination Control No. 95/001,485; 380 pp.; Sep. 29, 2011.
Office Action dated Mar. 29, 2012; Reexamination Control No. 95/001,485; USPTO; 103 pp.
Server Technology, Inc.; "Patent Owner's Response to Non-Final Office Action"; Reexamination Control No. 95/001,485; dated May 29, 2012; 56 pp.
Carrel W. Ewing; "Second Declaration of Carrel W. Ewing Under 37 CFR §1.132"; Reexamination Control No. 95/001,485; May 29, 2012; 140 pp.
Chris Hardin; "Second Declaration of Chris Hardin Under 37 CFR 1.132"; Reexamination Control No. 95/001,485; May 29, 2012; 9 pp.
Michael B. Aucoin; "Second Declaration of B. Michael Aucoin Under 37 CFR 1.132"; Reexamination Control No. 95/001,485; May 29, 2012; 58 pp.
Michael R. Henson; "Declaration of Michael R. Henson Under 37 CFR §1.132"; Reexamination Control No. 95/001,485; May 29, 2012; 30 pp.
KC Mares; Second Declaration of KC Mares Under 37 CFR 1.132; Reexamination Control No. 95/001,485; May 29, 2012; 5 pp.
"APC MasterSwitch", PC Magazine, May 5, 1998.
"Keeping Up With . . . ", Internet Telephony, Mar. 2000, pp. 84-87.
"Rebooting Across the Net", PC Magazine, May 5, 1998.
"Server Technology Sentry R-2000", PC Magazine, May 5, 1998.
2T-HA10F-CD 3.6 kVA Uninterruptible Power System: Operating information, Digital Equipment Corp., Order No. EK-HA10F-OP. B01, pp. 1-1 to 5-4, Aug. 1992.
A Software managing Clustered Multi-Vender Uninteruptible Power Supply on Network, IBM Tech. Disclosure Bulletin, vol. 42, No. 419, Mar. 1, 1999.
American Power Conversion Corporation, "MasterSwitch Installation and Quick Start Manual," Oct. 1999, 15 pp., USA.
American Power Conversion Corporation, "MasterSwitch Power Distribution Unit User's Guide," Mar. 2001, 56 pp., USA.
American Power Conversion Corporation, "MasterSwitch VM Power Distribution Unit User Guide," Dec. 1999, 51 pp., USA.
American Power Conversion Corporation; MasterSwitch VM Power Distribution Unit Installation and Quick Start Manual; 2000; 20 pp.
American Power Conversion Corporation; Masterswitch VM Power Distribution Unit User Guide; 1999; 51 pp.
American Power Conversion Corporation; PowerNet SNMP Management Information Base (MIB) v3.1.0 Reference Guide; 1999; 48 pp.
American Power Conversion, "APC NetShelter", 1995, #996-0643-A, APC, West Kingston, RI 02892 USA.
American Power Conversion, "APC Smart-UPS RM", 1996, #996-0618-B, APC, West Kingston, RI 02892 USA.
American Power Conversion, "APC Smart-UPS XL", 1996, #996-0630-B, APC, West Kingston, RI 02892 USA.
American Power Conversion, "Application Note #A2", Oct. 1993, APC, West Kingston, RI 02892 USA.
American Power Conversion, "Application Note #A6", Oct. 1993, APC, West Kingston, RI 02892 USA.
American Power Conversion, "Application Notes", Oct. 1996, #996-0495-C, APC, West Kingston, RI 02892 USA.
American Power Conversion, "Built-in Serial UPS Support in Windows 2000 Developd by APC", Dec. 6, 2000, APC, West Kingston, RI 02892USA.
American Power Conversion, "Call-UPS", 1991, #996-0070, APC, West Kingston, RI 02892 USA.
American Power Conversion, "Internetworking Power Protection", 1996, #996-0295-B, APC, West Kingston, RI 02892 USA.
American Power Conversion, "Internetworking Power Protection", Jan. 1994, # 996-0295, APC, West Kingston, RI 02892 USA.
American Power Conversion, "Introducing the UPS to build your business on . . . ", Oct. 1993, #996-0207-A, APC, West Kingston, RI 02892 USA.
American Power Conversion, "MasterSwitch plus", Dec. 6, 2000, APC, West Kingston, RI 02892USA.
American Power Conversion, "Measure-UPS ", Mar. 1993, #996-0127, APC, West Kingston, RI 02892 USA.
American Power Conversion, "PowerChute plus", 1996, #996-0041-C, APC, West Kingston, RI 02892USA.

(56) References Cited

OTHER PUBLICATIONS

American Power Conversion, "PowerNet.quadrature.", 1996, #996-0325D, APC, West Kingston, RI 02892USA.
American Power Conversion, "PowerNet. SNMP Adapter", Jan. 1994, #996-0126, APC, West Kingston, RI 02892 USA.
American Power Conversion, "PowerNet", 1998, #996-0325D, APC, West Kingston, RI 02892 USA.
American Power Conversion, "PowerNet", Sep. 1995, #996-0325-b, APC, West Kingston, RI 02892 USA.
American Power Conversion, "Smart-UPS", 1996, #996-0386-E APC, West Kingston, RI 02892USA.
American Power Conversion, "Solutions '94", Feb. 1994, #996-0131, APC, West Kingston, RI 02892 USA.
American Power Conversion, "UPS Accessories", 1996, #996-0411-C, APC, West Kingston, RI 02892 USA.
Bay Technical Associates, Inc., "Addendum to Owner's Manual, DS30/RPC-21," 1999, 4 pp., USA.
Bay Technical Associates, Inc., "Owner's Manual, Baytech Remote Power Control Unit," Jan. 2000, 80 pp., USA.
Bay Technical Associates, Inc.; download of www.BayTech.net from web.archive.org; 1997; 8 pp.
Bay Technical Associates, Inc.; Owner's Manual for BayTech Remote Power Control Unit for Models RPC-2, RPC-2A, RPC-2 MD01, RPC3-15 Amp, RPC3-20 Amp, RPC-3A, RPC-4, RPC-5, RPC-7, RPC-21; Jan. 2000; 80 pp.
Betty Yuan, "Remote Control Equals Power," Teleconnect, Feb. 2000, pp. 60-66, New York, NY USA.
Davison, M., et al. UPS Management Information Base, Internet Draft, IETF, pp. 1-28, May 13, 1992.
Distributed Power Module Product List, Sep. 23, 2002.
Drake, P., "Using SNMP to Manage Networks", pp. 2/1-2/4, 1991.
Ewing, B. and Mallory, J., "Power-ON/OFF-Product Information", 1990, Server Technology, Inc., Reno, Nevada.
Intelligent Power Module © 1991.
Interworking Labs Releases New, Extended SNMP Test Suite with Windows NT and Windows 95 Support, Interworking Labs, pp. 1-2, Jul. 15, 1996.
Liebert SiteNet SNMP MIBs, The Latest MIBs Available for Download, http://www.liebert.com/products/english/products/software/snmp/intro.asp?ID=921, pp. 1-2, Jul. 2, 2003.
Local and Remote Power—On/Off Alternatives © 1991.
M2 Communications Ltd. M2 Presswire; BayTech's vertically mounted power strip helps network managers keep equipment up and running; Nov. 19, 1999; 1 p.
Mirapath, A Cyclades Premier Partner, "AlterPath PM User Guide," 49 pages, © 2003 and Jun. 2003.
Needleman, R., "Power-ON/OFF Lets You Turn on Remote PCs by Phone", Feb. 1991, Info World Impression, V. 13, Issue 5.
New Box Specification, dated Mar. 6, 1991.
Newman, J., Enterprise Power Protection: Don't Get UPSet; Get the Right UPS Instead, Network Computing, vol. 7, No. 2, pp. 1-10, Feb. 15, 1996.
Novak, T. "Remote Management of Individual Power Supplies", netman.cit.buffalo.edu/CDN-M, p. 1, May 10, 1995.
Power-On product wrapper ©1991.
Remote Power-On/Off product wrapper © 1991.
RPM-15 Power Module Specification, Mar. 18, 1991.
Sentry 110/230 VAC Product Family © 2000.
Sentry Administrator R-450 © 2001/2002.
Sentry Administrator R-450 Remote Pwr. Mgr. © 1998.
Sentry Ambassador Remote Power Manager © 1996.
Sentry Commander R-400 Remote Power Mgr. © 2001/2002.
Sentry Commander R-400 Remote Pwr. Mgr. Datasheet 1999.
Sentry Expanded Function Power Tower (PTEF) © 2001/2002.
Sentry Power Manager—48 VDC Product Family © 2000.
Sentry Power Modules © 1999.
Sentry Power On/Off, Installation and Operations Manual, ©1991.
Sentry Power Tower Power Distribution © 2001/2002.
Sentry Power Tower Products © 2001/2002.
Sentry R-2000 Remote Power Manager © 2001.
Sentry Remote Power Manager brochure © 1991.
Sentry Remote Power Manager, Operational Instructions, Sep. 24, 1992.
Sentry Serial Power Tower (PTSS) © 2001/2002.
Server Technology, Inc., "Any-To-Any Matrix Communications Switch", 1996, Server Technology, Inc. Reno, Nevada.
Server Technology, Inc., "How Do You ReBoot Remote Equipment?", 1999, Server Technology, Inc., Reno, Nevada.
Server Technology, Inc., "LAN WAN, Enterprise, Internet Access Equipment", 1996, Server Technology, Inc., Reno, Nevada.
Server Technology, Inc., "MasterSwitch", 1996, Server Technology, Inc., Reno, Nevada.
Server Technology, Inc., "SENTRY Administrator R-450 Remote Power Manager", 1999, Server Technology, Inc., Reno, Nevada.
Server Technology, Inc., "Sentry Ambassador", 1996, Server Technology, Inc., Reno, Nevada.
Server Technology, Inc., "SENTRY Communications and User Interface", 1996, Server Technology, Inc., Reno, Nevada.
Server Technology, Inc., "SENTRY Power Modules", 1996, Server Technology, Inc., Reno, Nevada.
Server Technology, Inc., "Sentry Power Tower", 2000, Server Technology, Inc., Reno, Nevada.
Server Technology, Inc., "SENTRY R-2000 Remote Power Manager", 1999, Server Technology, Inc., Reno, Nevada.
Server Technology, Inc., "SENTRY ShutDown Remote Power Manager", 1997, Server Technology, Inc., Reno, Nevada.
Server Technology, Inc., "SENTRYINTERNATIONAL", 1996, Server Technology, Inc., Reno, Nevada.
Server Technology, Inc., "SENTRYRACK", 1996, Server Technology, Inc., Reno, Nevada.
Server Technology, Inc., "SENTRYSHELF", 1996, Server Technology, Inc., Reno, Nevada.
Server Technology, Inc., "VersaTimer Operations Manual, Thank you for purchasing the VersaTimer," 3 pages, © 1995.
Server Technology, Inc., "VersaTimer, A 7-Day, Programmable Power Scheduler," 2 pages, © 1994.
Slater, M., "Microprocessor-Based Design—A Comprehensive Guide to Hardware Design", pp. 19-24, 1989.
Stevens, W. R., "TCP/IP Illustrated, vol. 1—The Protocols", pp. 359-361, 1994.
Systems Enhancement Corporation, "Power Administrator 800 User Manual," Oct. 1, 1996, Systems Enhancement Corporation, Chesterfield, MO, USA.
Touch-Pad Code-Actuated Electrical Outlet, IBM Tech. Disclosure Bulletin, vol. 33, No. 1A, 143-147, Jun. 1, 1990.
Uninteruptable Power Source FAQ, v. 1.0, pp. 1-10, Feb. 10, 1994.
UPS MIB, Merling Gerin—DAM Division, www.exploits.org/nut/library/protocols/snmp/mgeups.mib, pp. 1-41, Oct. 11, 1995.
Western Telematic, Inc., "NPS Series Network Power Switch Models NPS-115 and NPS-230, WTI Part No. 12927 Rev. C, User's Guide," 19 pages, © 1999.
Western Telematic, Inc., "RMM Rack Mount Data/Fax Modern, WIT Part No. 12548 Rev. F, User's Guide," 15 pages, © 1998.
Order on APC's Motion for Summary Judgment, *Server Technology, Inc. v. American Power Conversion Corporation*; U.S. District Court, District of Nevada, Case No. 3:06-cv-00698-LRH-VPC; 30 pp.; (Sep. 28, 2012).
Order on STI's Motion for Summary Judgment, *Server Technology, Inc. v. American Power Conversion Corporation*; U.S. District Court, District of Nevada, Case No. 3:06-cv-00698-LRH-VPC; 30 pp.; (Sep. 28, 2012).
APC's Motion for Reconsideration Related to the Court's Order on Summary Judgment, *Server Technology, Inc. v. American Power Conversion Corporation*; U.S. District Court, District of Nevada, Case No. 3:06-CV-00698-LRH-VPC; 60 pp.; (Oct. 12, 2012).
STI's Response to APC's Motion for Reconsideration Related to the Courts Order on Summary Judgment, *Server Technology, Inc. v. American Power Conversion Corporation*; U.S. District Court, District of Nevada, Case No. 3:06-cv-00698-LRH-VPC; 15 pp.; (Oct. 26, 2012).
APC's Reply in Support of Its Motion for Reconsideration Related to the Court's Order on Summary Judgment, *Server Technology,*

(56) References Cited

OTHER PUBLICATIONS

*Inc.* v. *American Power Conversion Corporation*; U.S. District Court, District of Nevada, Case No. 3:06-cv-00698-LRH-VPC; 12 pp.; (Nov. 6, 2012).
STI's Surreply Memorandum in Opposition to APC's Motion for Reconsideration Related to the Court's Order on Summary Judgment, *Server Technology, Inc.* v. *American Power Conversion Corporation*; U.S. District Court, District of Nevada, Case No. 3:06-cv-00698-LRH-VPC; 12 pp.; (Jun. 17, 2013).
Order on APC's Motion for Reconsideration, *Server Technology, Inc.* v. *American Power Conversion Corporation*; U.S. District Court, District of Nevada, Case No. 3:06-cv-00698-LRH-VPC; 9 pp.; (Jul. 22, 2013).
Order, *Server Technology, Inc.* v. *American Power Conversion Corporation*; U.S. District Court, District of Nevada, Case No. 3:06-cv-00698-LRH-VPC; 3 pp.; Aug. 8, 2014.
APC's Renewed Motion for Judgment as a Matter of Law or a New Trial, *Server Technology, Inc.* v. *American Power Conversion Corporation*; U.S. District Court, District of Nevada; Case No. 3:06-cv-00698-LRH-VPC; 38 pp.; (Sep. 5, 2014).
STI's Response to APC's Renewed Motion for Judgment as a Matter of Law or a New Trial, *Server Technology, Inc.* v. *American Power Conversion Corporation*; U.S. District Court, District of Nevada; Case No. 3:06-cv-00698-LRH-VPC; 70 pp.; Sep. 29, 2014.
APC's Reply in Support of APC's Renewed Motion for Judgment as a Matter of Law or a New Trial, *Server Technology, Inc.* v. *American Power Conversion Corporation*; U.S. District Court, District of Nevada; Case No. 3:06-cv-00698-LRH-VPC; 26 pp.; Oct. 14, 2014.
Order of Amended Judgment; U.S. District Court, District of Nevada; Case No. 3:06-cv-00698-LRH-VPS; 3 pp.; Apr. 14, 2015.
Complaint for Patent Infringement, *Server Technology, Inc.* v. *Raritan Inc.* and *Raritan Americas, Inc.*, In the U.S. District Court, District of Nevada; Case No. 3:15-cv-00330-MMD-WGC; 78 pp.; Jun. 22, 2015.
First Amended Complaint for Patent Infringement, *Server Technology, Inc.* v. *Raritan Inc.* and *Raritan Americas, Inc.*, In the U.S. District Court for the District of Nevada; Case No. 3:15-cv-00330-MMD-WGC; 13 pp.; Jun. 29, 2015.
Raritan Inc. and Raritan Americas, Inc.'s Answer, Affirmative Defenses, and Counterclaims to First Amended Complaint for Patent Infringement; Case No. 3:15-cv-00330-MMD-WGC; 53 pp.; Sep. 3, 2015.
Complaint for Patent Infringement, *Server Technology, Inc.* v. *American Power Conversion Corporation* and *Schneider Electric IY Corporation*; Case No. 3:15-cv-00329-MMD-WDC; 49 pp.; Jun. 22, 2015.
American Power Conversion Corporation and Schneider Electric IT Corporation's Answer to Complaint for Patent Infringement, Affirmative Defenses, and Counterclaims; Case No. 3:15-cv-00329-MMD-WDC; 44 pp.; Aug. 19, 2015.
Server Technology, Inc.'s Answer to Defendants' Counterclaims; Case No. 3:15-cv-00329-MMD-WDC; 18 pp.; Sep. 14, 2015.
Patent Owner's Supplemental Response to Non-final Office Action; Reexamination Control No. 95/001,485; 12 pp.; (dated Jun. 28, 2012).
Requestor APCC's Comments on Office Action dated Mar. 19, 2012 and Patent Owners STI's Response; Reexamination Control No. 95/001,485; 34 pp. (Jun. 28, 2012).
Action Closing Prosecution, Reexamination Control No. 95/001,485; 107 pp.; (Jun. 21, 2013).
Patent Owner's Response to Action Closing Prosecution; Reexamination Control No. 95/001,485; 26 pp.; (dated Jul. 22, 2013).
Requester APC's Comments on Action Closing Prosecution dated Jun. 21, 2013 and Patent Owner's Response; Reexamination Control No. 95/001,485; 45 pp.; (Aug. 21, 2013).
Right of Appeal Notice for Reexamination Control No. 95/001,485; 97 pp.; (Oct. 24, 2013).
Patent Owner's Notice of Appeal; Reexamination Control No. 95/001,485; 6 pp.; (Nov. 22, 2013).

Third Party Requestor Notice of Cross Appeal; Reexamination Control No. 95/001,485; 10 pp.; (Dec. 6, 2013).
Appeal Brief in Inter Partes Reexamination by Patent Owner; Reexamination Control No. 95/001,485; 337 pp.; (Feb. 2, 2014).
Third Party Requester APC's Cross-Appeal Brief; Reexamination Control No. 95/001,485; 135 pp.; (Feb. 6, 2014).
Supplemental Appeal Brief in Inter Partes Reexamination by Patent Owner; Reexamination Control No. 95/001,485; 327 pp. (Mar. 13, 2014).
Third Party Requester APC's Cross-Appeal Brief (Amended); Reexamination Control No. 95/001,485; 56 pp.; (Mar. 13, 2014).
Patent Owner Respondent Brief in Inter Partes Reexamination; Reexamination Control No. 95/001,485; 257 pp. (Apr. 14, 2014).
Third Party Requester APC's Response to Patent Owner STI's Supplemental Appeal Brief in Inter Partes Reexamination; Reexamination Control No. 95/001,485; 92 pp. (Apr. 14, 2014).
Third Party Requester APC's Response to Patent Owner STI's Supplemental Appeal Brief in Inter Partes Reexamination (Amended); Reexamination Control No. 95/001,485; 175 pp. Jun. 2, 2014).
Third Party Requester APC's Rebuttal Brief; Reexamination Control No. 95/001,485; 11 pp.; (Jul. 21, 2014).
Rebuttal Brief in Inter Partes Reexamination by Patent Owner; Reexamination Control No. 95/001,485; 134 pp.; (Jul. 21, 2014).
Renewed Petition to Reopen Prosecution in Intres Partes Reexamination Proceeding; 14 pp.; (Sep. 23, 2014).
Decision on Appeal; Appeal 2015-004779; Reexamination Control No. 95/001,485; 30 pp.; (Sep. 29, 2015).
Petition for Inter Partes Review of U.S. Pat. No. 7,702,771 with Exhibits 1001-1032; IPR2015-01596; Jul. 15, 2015.
Petition for Inter Partes Review of U.S. Pat. No. 7,043,543 with Exhibits 1001-1032; IPR2015-01597; Jul. 17, 2015.
Server Technology, Inc.'s Answer to Defendants' Counterclaims; Case No. 3:15-cv-00330-MMD-WGC; 53 pp.; Sep. 28, 2015.
Patent Owner's Request for Reopening of Prosecution Before the Examiner; Reexamination Control No. 95/001,485; 50 pp; (Oct. 29, 2015).
Declaration of Calvin Nicholson Under 37 C.F.R. § 1.132; Reexamination Control No. 95/001,485; 18 pp.; (Oct. 29, 2015).
Third Declaration of B. Michael Aucoin Under 37 C.F.R. § 1.132; Reexamination Control No. 95/001,485; 18 pp.; (Oct. 29, 2015).
Patent Owner's Preliminary Response Pursuant to 37 CFR § 42.107; Inter Partes Review of U.S. Pat. No. 7,702,771; IPR2015-01596; Nov. 4, 2015.
Patent Owner's Exhibit List; Patent Owner's Preliminary Response Pursuant to 37 CFR § 42.107; Inter Partes Review of U.S. Pat. No. 7,702,771; IPR2015-01596; Nov. 4, 2015.
Exhibit 2001 to Patent Owner's Preliminary Response Pursuant to 37 CFR § 42.107; Inter Partes Review of U.S. Pat. No. 7,702,771; IPR2015-01596; Nov. 4, 2015.
Exhibit 2002 to Patent Owner's Preliminary Response Pursuant to 37 CFR § 42.107; Inter Partes Review of U.S. Pat. No. 7,702,771; IPR2015-01596; Nov. 4, 2015.
Exhibit 2003 to Patent Owner's Preliminary Response Pursuant to 37 CFR § 42.107; Inter Partes Review of U.S. Pat. No. 7,702,771; IPR2015-01596; Nov. 4, 2015.
Exhibit 2004 to Patent Owner's Preliminary Response Pursuant to 37 CFR § 42.107; Inter Partes Review of U.S. Pat. No. 7,702,771; IPR2015-01596; Nov. 4, 2015.
Patent Owner's Preliminary Response Pursuant to 37 CFR § 42.107; Inter Partes Review of U.S. Pat. No. 7,043,543; IPR2015-01597; Oct. 23, 2015.
Patent Owner's Exhibit List; Patent Owner's Preliminary Response Pursuant to 37 CFR § 42.107; 42.107; Inter Partes Review of U.S. Pat. No. 7,043,543; IPR2015-01597; Oct. 23, 2015.
Exhibit 2001 to Patent Owner's Preliminary Response Pursuant to 37 CFR § 42.107; 42.107; Inter Partes Review of U.S. Pat. No. 7,043,543; IPR2015-01597; Oct. 23, 2015.
Exhibit 2002 to Patent Owner's Preliminary Response Pursuant to 37 CFR § 42.107; 42.107; Inter Partes Review of U.S. Pat. No. 7,043,543; IPR2015-01597; Oct. 23, 2015.
Examination Report for Australian Application No. 2017200914; dated Feb. 13, 2018; 4 pages.

(56) References Cited

OTHER PUBLICATIONS

Examination Report for Canadian Patent Application No. 2,864,167; dated Dec. 7, 2015; 4 pages.
Examination Report for Canadian Patent Application No. 2,864,167; dated Dec. 12, 2016; 5 pages.
Examination Report for Canadian Patent Application No. 2,864,167; dated Oct. 18, 2017; 4 pages.
Chinese Office Action for Chinese Application No. 201380013150.X; dated Apr. 25, 2016; 32 pages.
Chinese Office Action for Chinese Application No. 201380013150.X; dated Feb. 15, 2017; 15 pages.

* cited by examiner

SYSTEMS AND METHODS FOR CONFIGURING A POWER DISTRIBUTION UNIT

CROSS-REFERENCE TO RELATED APPLICATION(S)

This application is a continuation of U.S. patent application Ser. No. 13/371,334, filed Feb. 10, 2012, titled "SYSTEM AND METHOD FOR CONFIGURING PLURALITY OF LINKED POWER DISTRIBUTION UNITS IN WHICH CONFIGURATION DATA OF THE LINKED POWER DISTRIBUTION UNITS ARE ACCESSIBLE BY THE REMOTE SYSTEM" the entirety of which is herein incorporated by reference.

This application is related to the following patents and are incorporated herein by reference in their entirety: U.S. Pat. No. 7,774,443, entitled "POWER-MANAGER CONFIGURATION UPLOAD AND DOWNLOAD METHOD AND SYSTEM FOR NETWORK MANAGERS," issued on Aug. 10, 2010; U.S. Pat. No. 8,494,661, entitled "DISTRIBUTION, MANAGEMENT, AND MONITORING SYSTEMS," issued on Jul. 23, 2013; and U.S. Pat. No. 8,321,163, entitled "MONITORING POWER-RELATED PARAMETERS IN A POWER DISTRIBUTION UNIT," issued on Nov. 27, 2012.

TECHNICAL FIELD

The present disclosure is directed to power distribution units and, more specifically, to systems and methods for configuring operational parameters of power distribution units.

BACKGROUND

A conventional Power Distribution Unit (PDU) is an assembly of electrical outlets (also called receptacles) that receive electrical power from a source and distribute the electrical power to one or more separate electronic appliances. Each such unit has one or more power cords plugged in to one or more of the outlets. PDUs also have power cords that can be directly hard wired to a power source or may use a traditional plug and receptacle connection. PDUs are used in many applications and settings such as, for example, in or on electronic equipment racks. One or more PDUs are commonly located in an equipment rack (or other cabinet), and may be installed together with other devices connected to the PDU such as environmental monitors, temperature and humidity sensors, fuse modules, or communications modules that may be external to or contained within the PDU housing. A PDU that is mountable in an equipment rack or cabinet may sometimes be referred to as a Cabinet PDU, or "CDU" for short.

As mentioned, computing facilities generally include electronic equipment racks, such as standard RETMA racks, that commonly comprise rectangular or box-shaped housings sometimes referred to as a cabinet or a rack and associated components for mounting equipment, associated communications cables, and associated power distribution cables. Electronic equipment is commonly mountable in such racks so that the various electronic devices are aligned vertically one on top of the other in the rack. Often, multiple such racks are oriented side-by-side, with each containing numerous electronic components and having substantial quantities of associated component wiring located both within and outside of the area occupied by the racks. Such racks commonly support equipment that is used in a computing network for an enterprise, referred to as an enterprise network.

In many cases, computing facilities such as server farms or data centers support large networks, referred to as enterprise networks. Enterprise networks exist to support large world-wide organizations and depend on a combination of technologies, e.g., data communications, inter-networking equipment such as frame relay controllers, asynchronous transfer mode (ATM) switches, routers, integrated services digital network (ISDN) controllers, and application servers, and network management application software. Such enterprise networks can be used to support a large company's branch offices or campuses throughout the world and, as such, these networks have become mission critical to the functioning of such organizations. Masses of information are routinely expected to be exchanged, and such information exchanges are necessary to carry on the daily business of modern organizations. For example, some international banks have thousands of branch offices placed throughout Europe, Asia and North America that each critically depend on their ability to communicate banking transactions quickly and efficiently with one another and with their respective headquarters. A typical enterprise network uses building blocks of router and frame relay network appliances mounted in equipment racks. Such equipment racks are distributed to remote point of presence (POP) locations in the particular network. Each equipment rack can include, for example, frame relay controllers, routers, ISDN controllers, servers, network attached storage devices, etc., each of which are connected to one or more power sources.

Many equipment racks may be located in a data center, each of which having one or more associated PDUs. One or more such data centers may serve as data communication hubs for an enterprise. On the other hand, more than one enterprise may use computing facilities in a data centers. In any event, a particular enterprise and/or a particular data center may have a large number of equipment racks and associated PDUs. Furthermore, many PDUs include network connections that provide for remote control and/or monitoring of the PDUs. Such PDUs generally have configurations that are programmed into the PDU such as, for example, network communication configurations, alarm threshold configurations, control configurations, etc. As mentioned, a particular enterprise and/or data center may have numerous PDUs, which may each need to be programmed with configuration information. Traditionally, each PDU is required to be programmed individually by initiating a programming session and then programming the PDU. Furthermore, any time configuration information is required to be updated, each PDU traditionally is required to be individually updated. As will be recognized, such a task may consume significant amounts of time when being performed on hundreds, or even thousands, of PDUs that may be located in one or more data centers, for example. Additionally, when new data centers are brought on-line, or additions to data centers are brought on-line, the pressure to get equipment installed and running often results in PDUs that are not configured, even though such PDUs have the capability to provide information and be controlled over the network. In some cases, even after the data center is brought on-line, such PDUs may not be configured, or are eventually configured after a relatively long time period, due to higher priority tasks to be performed by data center personnel.

SUMMARY

Methods, systems, and devices are described for configuration of multiple power distribution units in an efficient manner. Power distribution units may be discovered on a network, and automatically configured according to a configuration defined for a particular location. A location may be, for example, a geographical region, a data center, a zone within a data center, a cabinet, or an individual PDU. All PDUs associated with a particular location may be provided with a common configuration file that defines operating parameters for the PDUs. In such a manner, a user may simply connect the PDU to the network, with the appropriate configuration provided without additional involvement of the user.

One aspect of the disclosure provides a power distribution apparatus that includes a housing having a power input and a remote system communication interface, a plurality of power outputs disposed in the power distribution apparatus housing each connectable in power supply communication with the power input and one or more separate electronic appliances. The power distribution apparatus includes a configuration file accessible by a remote system through the remote system communication interface, the configuration file comprising configuration data corresponding to operating parameters of the power distribution apparatus. A power distribution apparatus identifier is stored in a memory associated with the power distribution apparatus, the power distribution unit identifier comprising data usable to identify a location of the power distribution apparatus. A configuration file transfer mechanism is in two-way communication (import/export) with the remote system communication interface. The configuration file may include, for example, configuration data corresponding to operating parameters for the PDU, including, for example, login banner, system settings, HTTP, IPv4, Telnet, SSH, SNTP, SSL, SMTP, SNMP, ftp, LDAP, Radius and TACACS+, user and user group definitions and permissions, and outlet group configurations. In some embodiments, the configuration file may also include at least on-off parameters for a subset of the plurality of outlets, user preference parameters, alarm threshold parameters, and network operating parameters, for example. The power distribution apparatus identifier may include a network identifier indicative of a location of the power distribution apparatus, such as a data center or a location within a data center. The power distribution apparatus identifier may also include information related to a user of the apparatus, with all power distribution apparatuses of a user being configured with the same or similar configuration files. A configuration substitution command mechanism may be in communication with the configuration file transfer mechanism, and configured to recognize a command to download a substitute configuration file to the configuration file storage memory from a remote system. The configuration file may also include configuration data corresponding to a power infeed associated with one or more of the power outputs, such as data corresponding to a utility power source associated with one or more of the power outputs.

In another aspect, a method for configuring the operation of a plurality of power distribution apparatus is provided. The method includes receiving a first power distribution unit identifier from a first power distribution apparatus over a network, determining, based on the first power distribution apparatus identifier, a first configuration file of a plurality of available configuration files for the first power distribution apparatus, and transmitting the first configuration file to the first power distribution apparatus. The first power distribution identifier may include location information related to the first power distribution apparatus for use in locating the first power distribution unit. The location information may include an identification of a data center that houses the first power distribution apparatus, or a location within a data center that houses the first power distribution apparatus, for example. The method may further include receiving a second power distribution apparatus identifier from a second power distribution apparatus over the network, determining, based on the second power distribution apparatus identifier, a second configuration file of the plurality of available configuration files for the second power distribution apparatus, and transmitting the second configuration file to the second power distribution apparatus. In one example, the first power distribution apparatus is located in a first area of a data center, and the second power distribution apparatus is located in a second area of the data center, and the first and second configuration files comprise different configuration data based on the first and second locations. The first configuration file may also include power infeed information identifying a first power infeed associated with the first location, and the second configuration file may include power infeed information identifying a second power infeed associated with the second location. In one embodiment, the first and second power distribution apparatuses are associated with respective customers of a data center, and the first and second configuration files include different configuration data based on requirements associated with the first and second customers.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
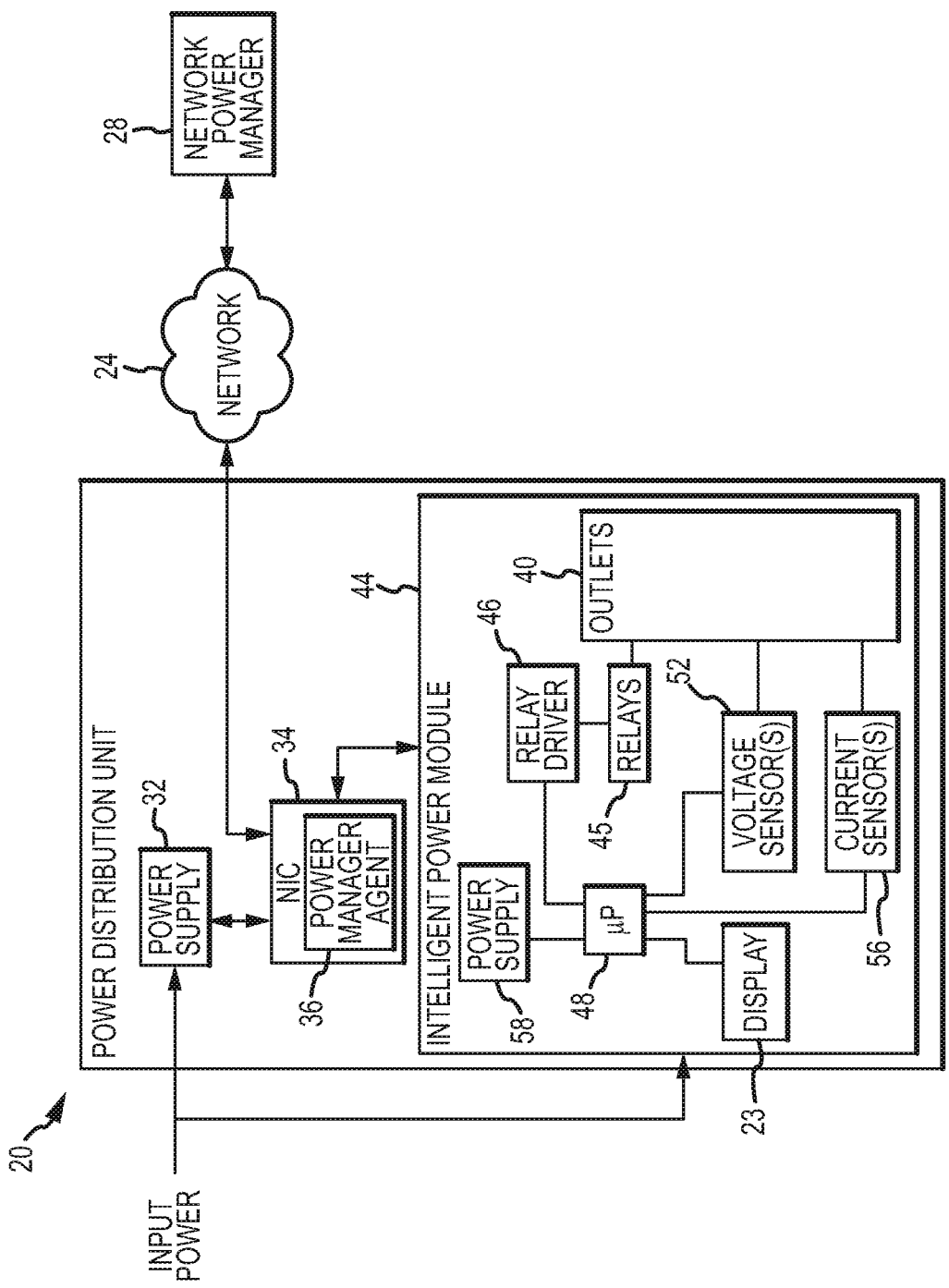
FIG. 1 is a block diagram of a power distribution system including components configured according to various embodiments.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Systems, devices, methods, and software are described for configuration of power distribution units (PDUs) in an efficient manner. Power distribution units may be discovered on a network, and manually or automatically configured according to a configuration defined for a particular location or particular group of PDUs. A location may be, for example, a geographical region, a data center, a zone within a data center, a cabinet, or an individual PDU. All PDUs associated with a particular location may be provided with a common configuration that defines operating parameters for the PDUs. Similarly, groups of PDUs such as PDUs associated with a particular service, application, or customer, may be provided with a common configuration that defines operating parameters for the PDUs associated with a group. Thus, when PDUs are configured or have a configuration update, all of the PDUs associated with a location may be configured or updated by pushing configuration information to each PDU. Such action may occur automatically, such as when a PDU is discovered on a network, or may occur manually when an operator initiates configuration or update of PDU(s) at a particular location.

In some embodiments, locations may be nested, such as, for example, all PDUs in a data center having a first subset of operating parameters, and all PDUs within an identified zone within the data center having a second subset of operating parameters. When a configuration file is pushed to PDUs in the data center, all PDUs, including the PDUs within the identified zone, receive the first subset of operating parameters. PDUs within the identified zone may receive the second subset of operating parameters at the same time, or at a different time, as receiving the first subset of operating parameters. The configuration file may include, for example, configuration data corresponding to operating parameters for the PDU, including, for example, login banner, system settings, HTTP, IPv4, Telnet, SSH, SNTP, SSL, SMTP, SNMP, ftp, LDAP, Radius and TACACS+, user and user group definitions and permissions, and outlet group configurations. In some embodiments, the configuration file may also include at least on-off parameters for a subset of the plurality of outlets, user preference parameters, alarm threshold parameters, and network operating parameters, for example.

With reference now to FIG. 1, a block diagram of an exemplary system 10 of an embodiment is now described. A PDU 20 supplies power to one or more associated computing assets. The PDU 20 is useable in a computer network 24, and may communicate over the computer network 24 with a network power manager application 28. The PDU 20 of this embodiment includes a power supply 32 that supplies operating power for the components within the PDU 20. Communication with network power manager 28 is conducted through a communications module such as a network interface card (NIC) 34 within the PDU 20. The network power manager 28 may reside in a workstation or other device that is used in the management of a data center or other enterprise management, and issues network commands over a network communications connection. The NIC 34 may include application firmware and hardware that allows the PDU 20 to communicate with various modules within a PDU, and in this embodiment includes a power manager agent application 36. The PDU 20 includes a plurality of power outlets 40 arranged within an intelligent power module (IPM) 44. The NIC 34, and power manager agent 36 are connected to the computer network 24. IPM 44 controls the application of power from the input power to a corresponding power outlet among the power outlets 40, and is in communication with the power manager agent application 36 to provide power and power cycling on-off for one or more of the corresponding power outlets, which may be accomplished through one or more relays 45 and associated relay driver 46. The IPM 44 receives input power, and provides power to one or more outlets 40 through the relays 45, although it will be readily understood that a PDU 20 may operate without the use of relays to control power applied to power outlets 40. The IPM 44 may also provide power state sensing or load sensing with respect to the corresponding power outlet in response to one or more commands. The IPM 44 in this embodiment includes a microprocessor 48 used to control the power applied to a corresponding power outlet. The microprocessor, according to the embodiment of FIG. 1, also is connected to a voltage sensing device 52 and a current sensing device 56 to sense the voltage and current at corresponding individual power outlet(s). The microprocessor 48 may use this information to determine the power supplied through an outlet, with such information provided through the NIC 34 to the network power manager 28. In this embodiment, the IPM 44 also includes a power supply 58 used to provide DC operating power to components within the IPM 44. A display 23, for example a single-digit or multi-digit LED display, may be included to provide a visual indication of voltage, current or another power metric; the display is shown as communicating with the microprocessor 48 but could instead communicate directly with other elements such as the sensors 56 or 52. The display may instead be driven by either the NIC 36 or the power supply 32.

The network power manager 28 of FIG. 1 communicates with the intelligent power module 44 through the power manager agent 36. In this embodiment, the network power manager 28 may receive information from, and provide instructions to, power manager agent 36 which communicates with IPM 44. The network power manager 28 may also receive related power measurements from the IPM 44

(through power manager agent 36) and report power information related to the PDU 20, and related to one or more individual outlets (and thus power information for individual assets powered by the outlet) of the PDU 20. The network power manager 28 also, in various embodiments, provides a configuration file to the PDU 20 that defines various operating parameters for the PDU 20. The configuration file may be stored in the NIC 34 as a part of the power manager agent 36, for example. In one embodiment, the MC 34 includes an identification that may be reported to the network power manager 28, which the network power manager 28 uses to determine the configuration file that is to be provided to the PDU 20, as will be described in more detail below.

Figure 2:
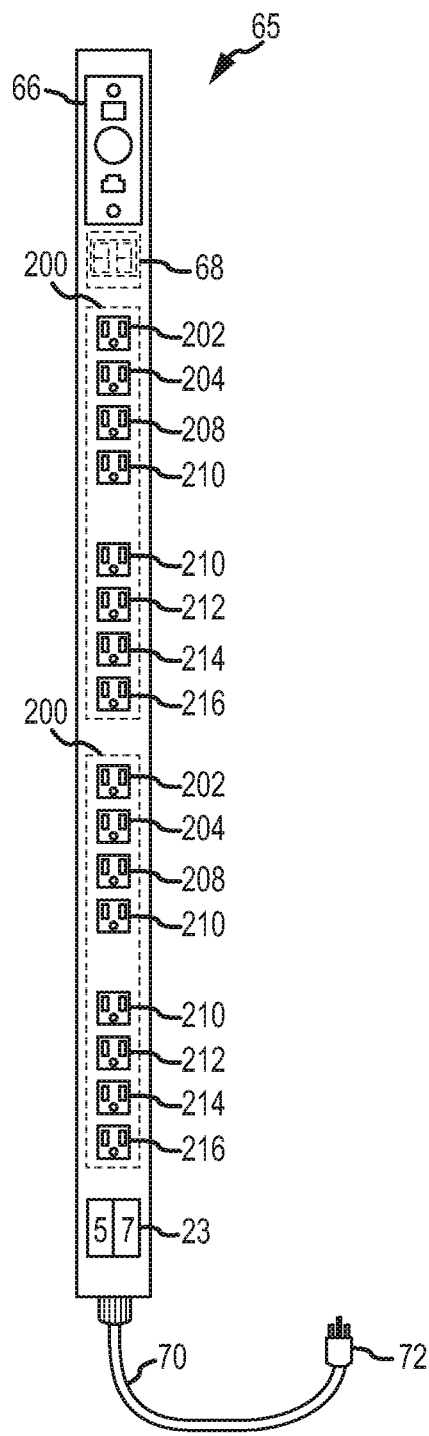
FIG. 2 is an illustration of an exemplary power distribution unit according to various embodiments.

FIG. 2 is an illustration of a PDU 65 that includes Intelligent Power Modules 200, along with a communications module 66 that provides communications functions, an environmental monitor port 68, and an input power cord 70 with associated plug 72. The PDU 65 according to this embodiment includes a housing that is vertically mountable in an equipment rack, although it will be understood that other form factors may be used, such as a horizontally mountable housing. The Intelligent Power Modules 200 each include eight outlets 202-216 that supply power to assets that may be mounted into an equipment rack. Such equipment racks are well known, and often include several individual assets that are used in operation of a data center. As is well known, numerous equipment racks may be included in a data center, and in various embodiments each asset in each equipment rack may be monitored for power usage through one or more associated IPMs 200. The visual display 23 (shown displaying the numeral "57") is disposed in the PDU 65 although in other embodiments the display might be external to the PDU 65.

In one embodiment, the power outlet module 200 includes eight outlets (202-216) each of NEMA 5-20R type, contained in a housing. It will be understood that this embodiment, and other embodiments described herein as having NEMA 5-20R type outlets, are exemplary only and that any of various other types of outlets alternatively can be used. For example, the "outlets" can be other NEMA types (e.g., NEMA 5-15R, NEMA 6-20R, NEMA 6-30R or NEMA 6-50R) or any of various IEC types (e.g., IEC C13 or IEC C19). It also will be understood that all "outlets" in a particular power outlet module 200, or other module-outlet described herein, need not be identical or oriented uniformly along the PDU. It also will be understood that the "outlets" are not limited to three-prong receptacles; alternatively, one or more of the "outlets" can be configured for two or more than three prongs in the mating male connector. It also will be understood that the "outlets" are not limited to having female prong receptacles. In any "outlet," one or more of the "prong receptacles" can be male instead of female connection elements, as conditions or needs indicate. In general, as used herein, female and male "prong receptacles" are termed "power-connection elements". Furthermore, the principles described herein also are applicable to devices that may be hard-wired into an outlet module. While outlet module 200 of this embodiment includes eight outlets, it will be understood that this is but one example and that an outlet module may include a different number of outlets.

The housing for an outlet module may be any suitable housing for such a device, as is known to one of skill in the art, and may be assembled with other modules in a PDU. Such a housing generally includes a front portion and a rear portion, the front portion is substantially planar, and the rear portion is substantially planar and parallel to the front portion. The housing also includes longitudinally extending side portions and transverse end portions. The front portion, rear portion, side portions, and end portions are generally orthogonal to each other in a generally rectangular or box-type configuration. The housing can be made of any suitable, typically rigid, material, including, for example, a rigid polymeric ("plastic") material. In at least certain embodiments, the front and rear portions are made from an electrically insulative material, whereas in other embodiments conducting materials are used for safe ground bonding. The side portions and the end portions may be integrally formed, optionally along with the front portion or the rear portion. Furthermore, while the outlet module described in this embodiment includes a housing, other embodiments may include an outlet module that does not include a housing. For example, an outlet module may include a number of outlets coupled together with no exterior housing that may then be installed into another piece of equipment.

Each outlet 202-216 is interconnected to the power source 32 through any of a number of well-known connection schemes, such as spade, lug, plug connectors, screw connectors, or other suitable type of connector. Furthermore, if desired, one or more of these electrical connectors can be located inside the housing or outside the housing, in embodiments where the power outlet module includes a housing.

Figure 3:
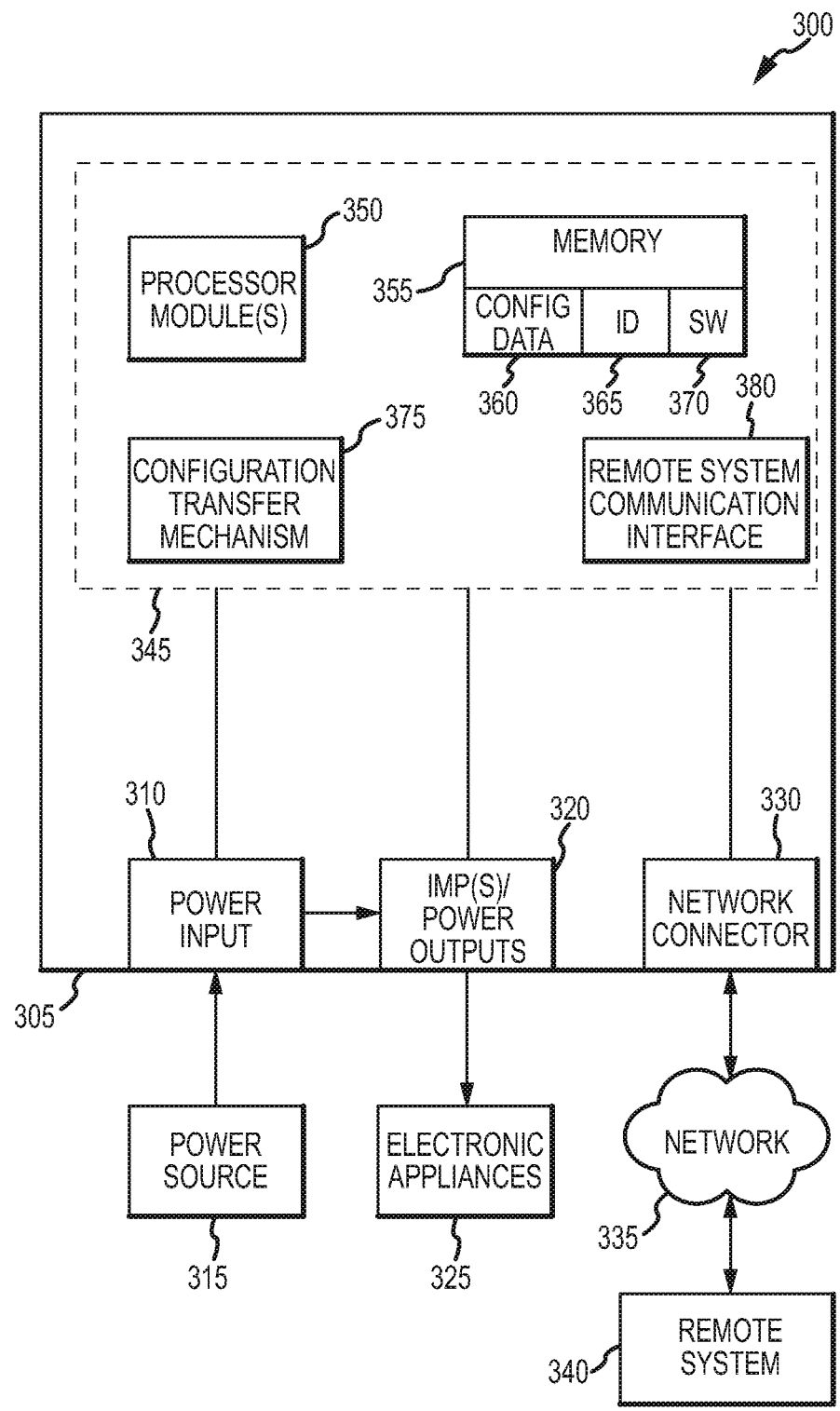
FIG. 3 is a functional block diagram of a power distribution system according to various embodiments.

FIG. 3 is a block diagram of a power manager system 300 of an embodiment. In this embodiment, a PDU 305 includes a power input 310 that receives power from a power source 315. Power from the power input 310 is provided to one or more IPM(s) and associated power outputs 320 for distribution to one or more electronic appliances 325. A network connector 330, such as an Ethernet or serial connector, provides a connection to a network 335 and remote system 340. A communications module 345, according to this embodiment, includes one or more processor module(s) 350. The processor module(s) 350 execute instructions related to various functions of the PDU. A memory 355 is included that stores, at least temporarily, configuration data 360 for the PDU, an identifier 365 for the PDU, and software 370 that when executed by the processor module(s) 350 causes the PDU 305 to perform various tasks including those described herein. Memory 355 may include any suitable volatile or non-volatile memory. A configuration transfer mechanism 375 operates to transfer configuration data 360 to and/or from the PDU 305, using remote system communication interface 380. In one embodiment, the configuration transfer mechanism 375 reports the PDU identifier 365 out to the remote system 340 via the remote system communication interface 380, network connector 330, and network 335. The remote system 340 receives the identifier 365 and determines a configuration to be provided to the PDU 305 based on the identifier 365. The identifier 365, in an embodiment, is an IP address. The remote system 340, based on the identifier, determines a location of the PDU 305 and the configuration for the PDU is determined based on the location of the PDU 305, in an embodiment. The location may be, for example, a country or region, a data center, or a location within a data center. In another embodiment, the location is determined based on a power infeed that supplies power to the PDU. In still another embodiment, the remote system 340 determines a particular customer associated with a PDU 305, and provides a configuration based on the requirements for the particular customer. Such a customer specific configuration may be provided to PDUs 305 in different locations.

Figure 4:
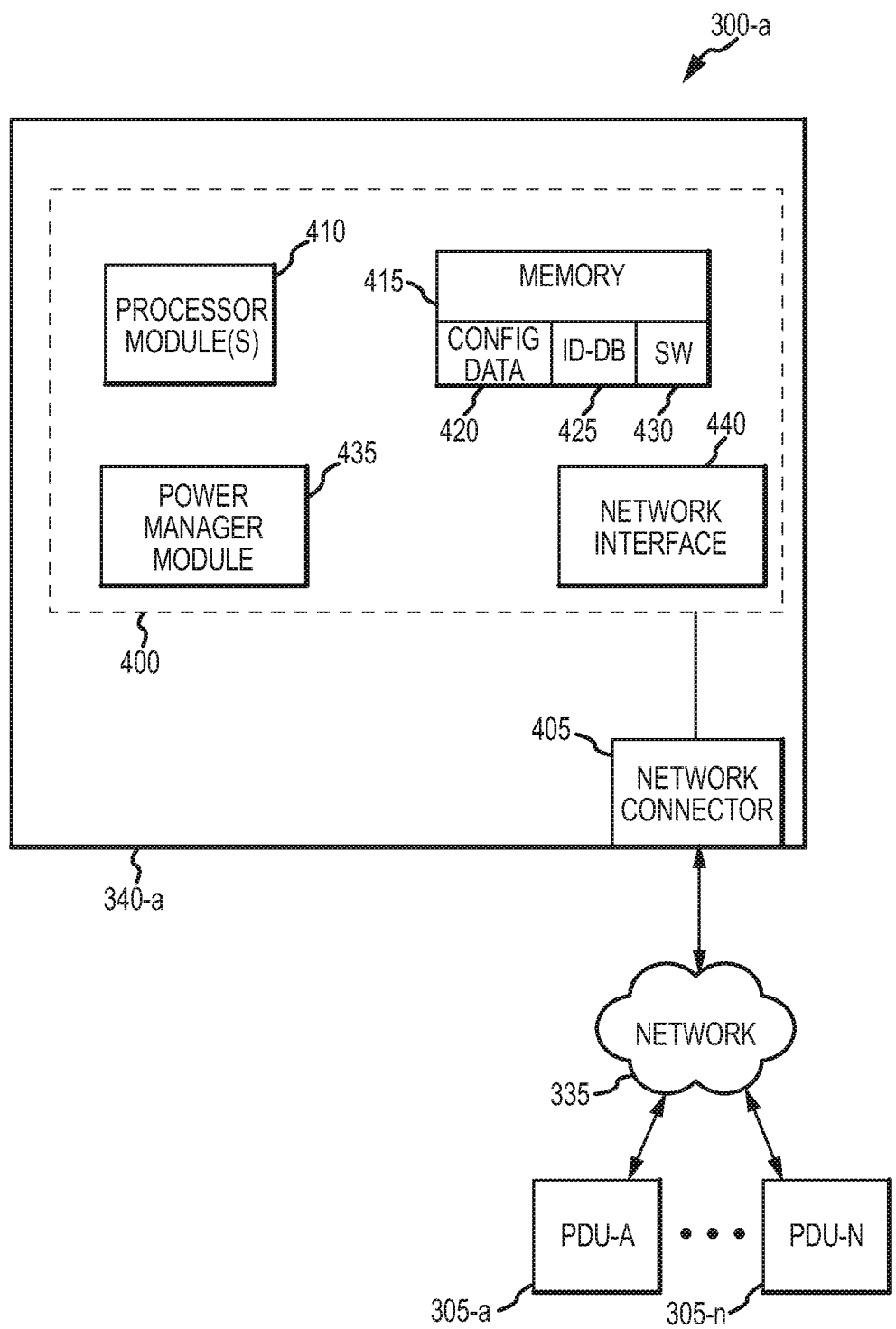
FIG. 4 is a functional block diagram of another power distribution system according to various embodiments.

FIG. 4 is a block diagram of a power manager system 300-*a* of another embodiment. In this embodiment, multiple PDUs 305-*a* through 305-*n* are connected to remote system 340-*a* through network 335. In this embodiment, remote system 340-*a* includes a power manager server 400 that interconnects to network 335 through network connector 405, such as an Ethernet or serial connection. The power manager server 400, in this embodiment, includes one or more processor module(s) 410 that execute instructions related to various functions of the remote system 340-*a*. A memory 415 is included that stores, at least temporarily, configuration data 420 for multiple different configurations of PDUs, an identification database 425, and software 430 that when executed by the processor module(s) 410 cause the remote system 340-*a* to perform various tasks including those described herein. Memory 415 may include any suitable volatile or non-volatile memory. Furthermore, some or all of the configuration data 420 and identification database 425 may be stored externally to the power manager server 400, such as in a remotely located storage system or database system. A power manager module 435 operates to transfer configuration data 360 to and/or from the PDUs 305, using network interface 440. In one embodiment, the power manager module 435 receives a PDU identifier from a PDU (PDU 305-*a*, for example) via the network interface 440, network connector 405, and network 335. The power manager module 435 receives the identifier, and accesses the identification database 425 to determine configuration data to be provided to the PDU 305-*a* based on the identifier 365. When the configuration is identified, the power manager module 435 retrieves the identified configuration data from configuration data storage 420 in memory 415, and provides the configuration data to the PDU 305-*a* via the network interface 440, network connector 405, and network 335. The identifier received from the PDU 305-*a*, in an embodiment, is an IP address. The power manager module 435, based on the identifier and information included in the identification database 425, determines a location of the PDU 305-*a*, and the configuration for the PDU is determined based on the location of the PDU 305-*a*, according to an embodiment. The location may be, for example, a country or region, a data center, a location within a data center (also referred to as a zone), a particular equipment rack, or a particular PDU. In another embodiment, the location is determined based on a power infeed that supplies power to the PDU. In still another embodiment, the power manager module 435 determines a particular customer associated with a PDU 305-*a*, and provides a configuration based on the requirements for the particular customer. Such a customer specific configuration may be provided to multiple PDUs 305 for a particular customer in different locations.

The components described with respect to the embodiments of FIGS. 3 and 4 may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

Figure 5:
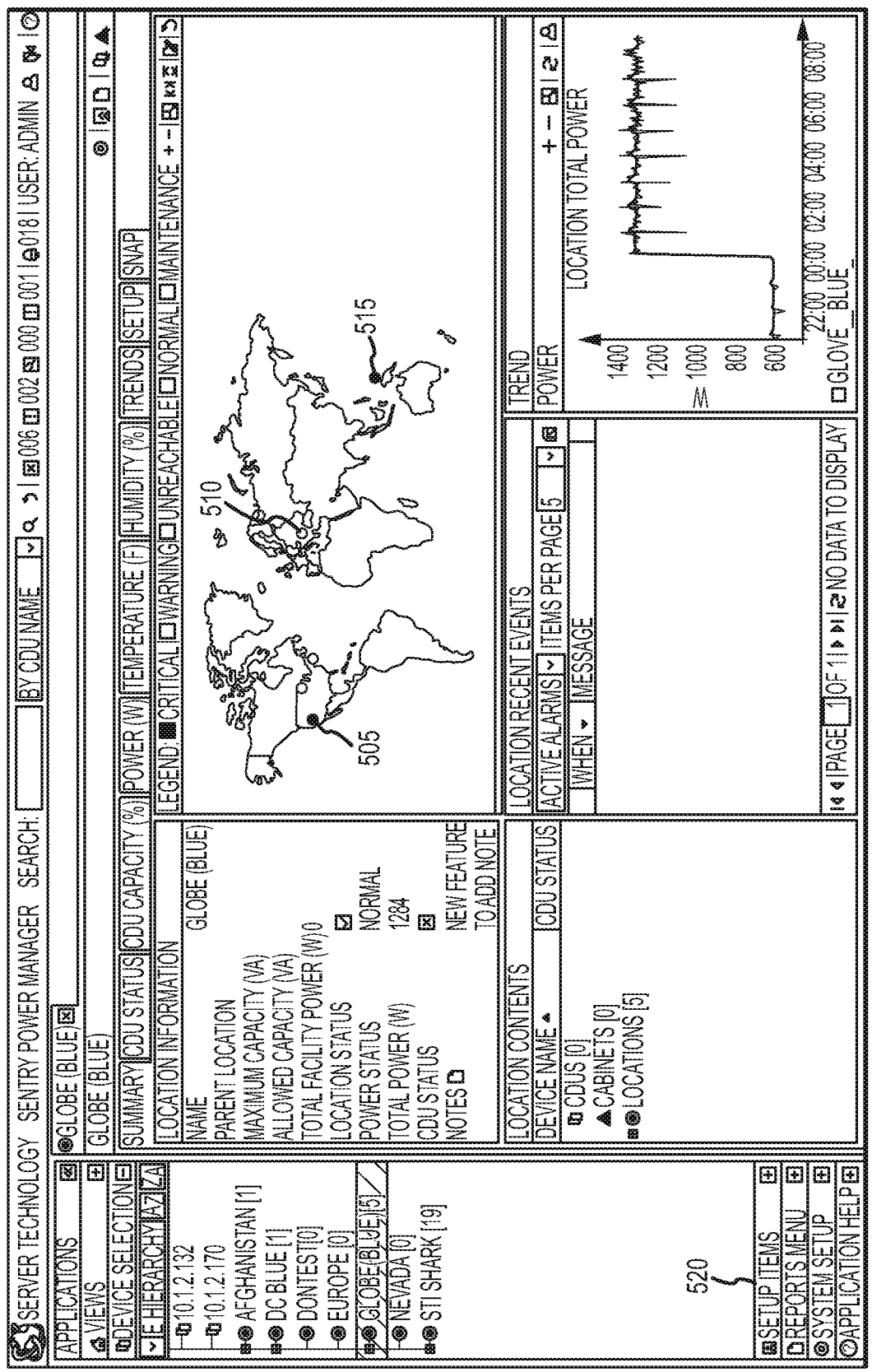
FIG. 5 is an illustration of geographic and/or data center locations according to an embodiment.
Figure 6:
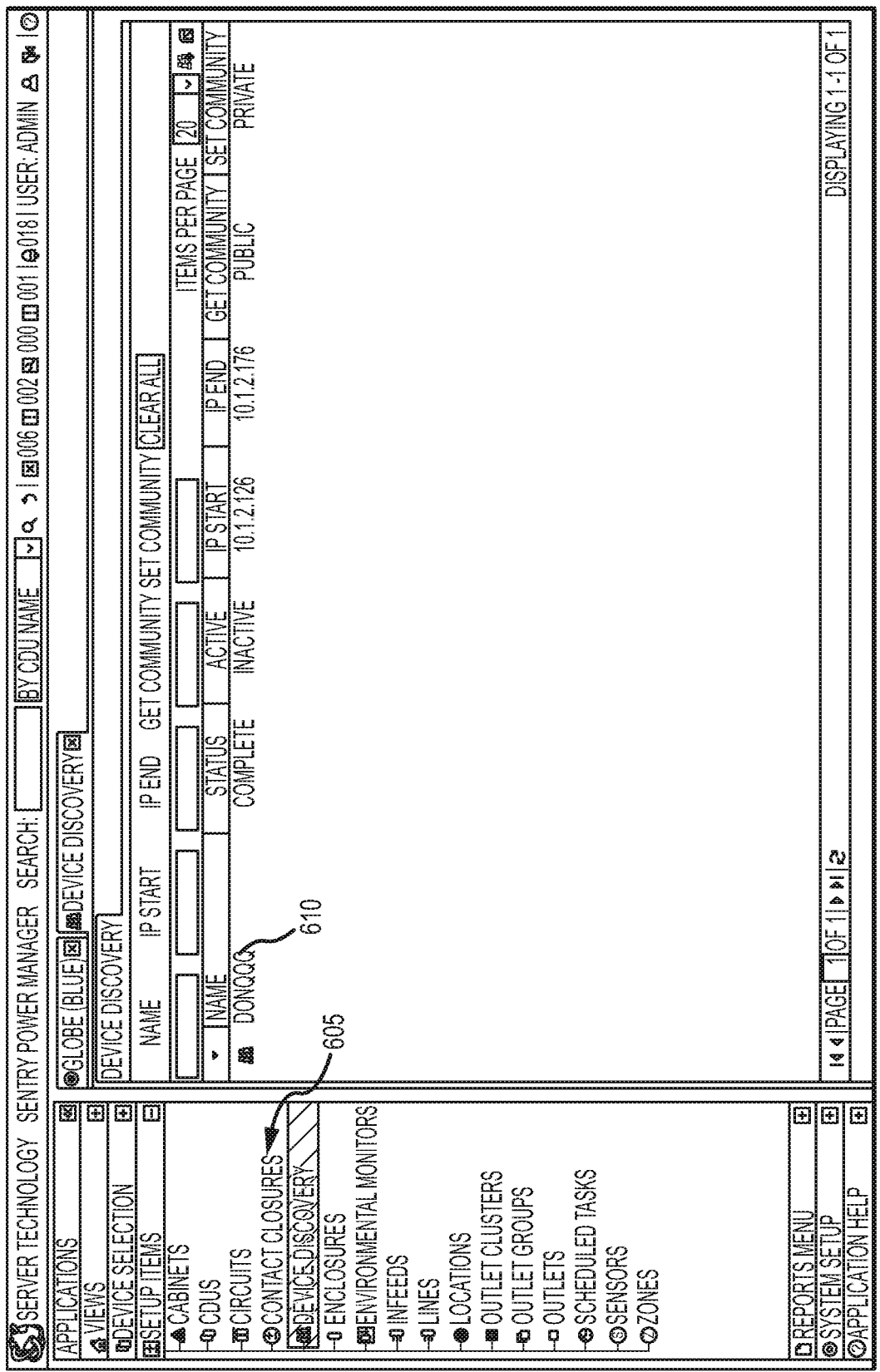
FIG. 6 is an exemplary user interface screen shot for setting device discovery parameters according to an embodiment.

With reference now to FIGS. 5-11, various different locations for PDUs according to various embodiments are discussed. As mentioned above, a location may be a region, such as North America, Europe, or Asia, or a particular data center such as a data centers 505, 510, and 515 as illustrated in FIG. 5. Each data center 505, 510, 515 includes a number equipment racks that each include one or more PDUs. According to various embodiments, PDUs located at various data centers may be discovered and configured automatically. The discovery of PDUs that are to be configured may be performed periodically, such as daily or weekly, or on demand. In one embodiment, device discovery settings are available, such as illustrated in the exemplary screen shot of FIG. 6. In this embodiment, user of a network power manager application 600 may select a device discovery item 605, which provides a listing 610 of different device discovery settings that may be saved for a particular network power manager application 600. New device discovery settings may be provided through a device discovery configuration mechanism, an exemplary screen shot 700 of which is provided in FIG. 7. In this example, a name 705 may be provided for the device discovery settings. A beginning IP address 710, and an ending IP address 715 are provided. In one embodiment, PDUs are provided that are Dynamic Host Configuration Protocol (DHCP) enabled. As is well known, DHCP automates network-parameter assignment to network devices from one or more DHCP servers. DHCP is useful because it makes it easy to add new machines to the network. When a DHCP-configured client (a computer or any other network-aware device) connects to a network, the DHCP client sends a broadcast query requesting necessary information from a DHCP server. The DHCP server manages a pool of IP addresses and information about client configuration parameters such as default gateway, domain name, the name servers, other servers such as time servers, and so forth. On receiving a valid request, the server assigns the computer an IP address, a lease (length of time the allocation is valid), and other IP configuration parameters, such as the subnet mask and the default gateway.

Figure 7:
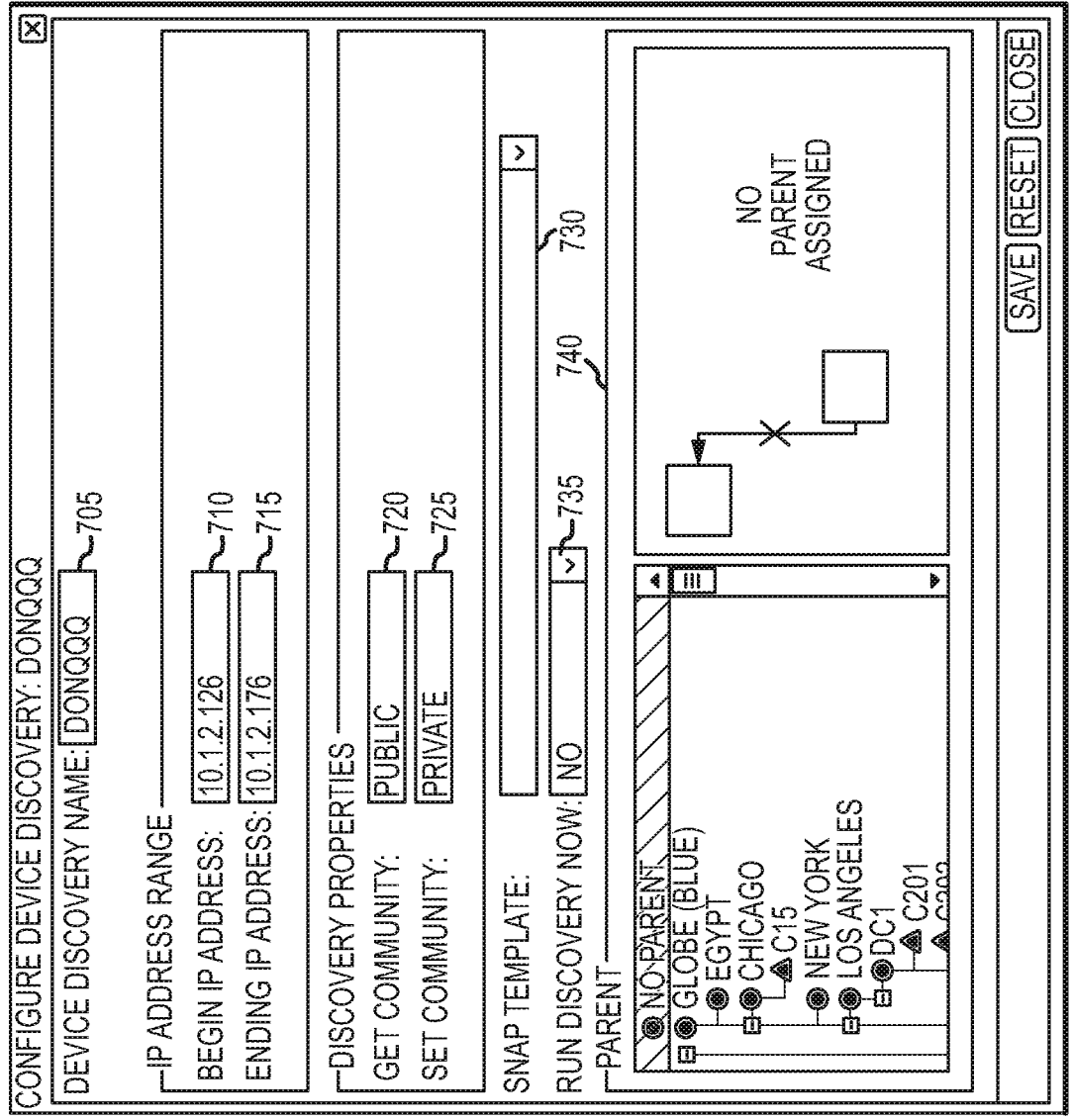
FIG. 7 is another exemplary user interface screen shot for setting device discovery parameters according to an embodiment.
Figure 8:
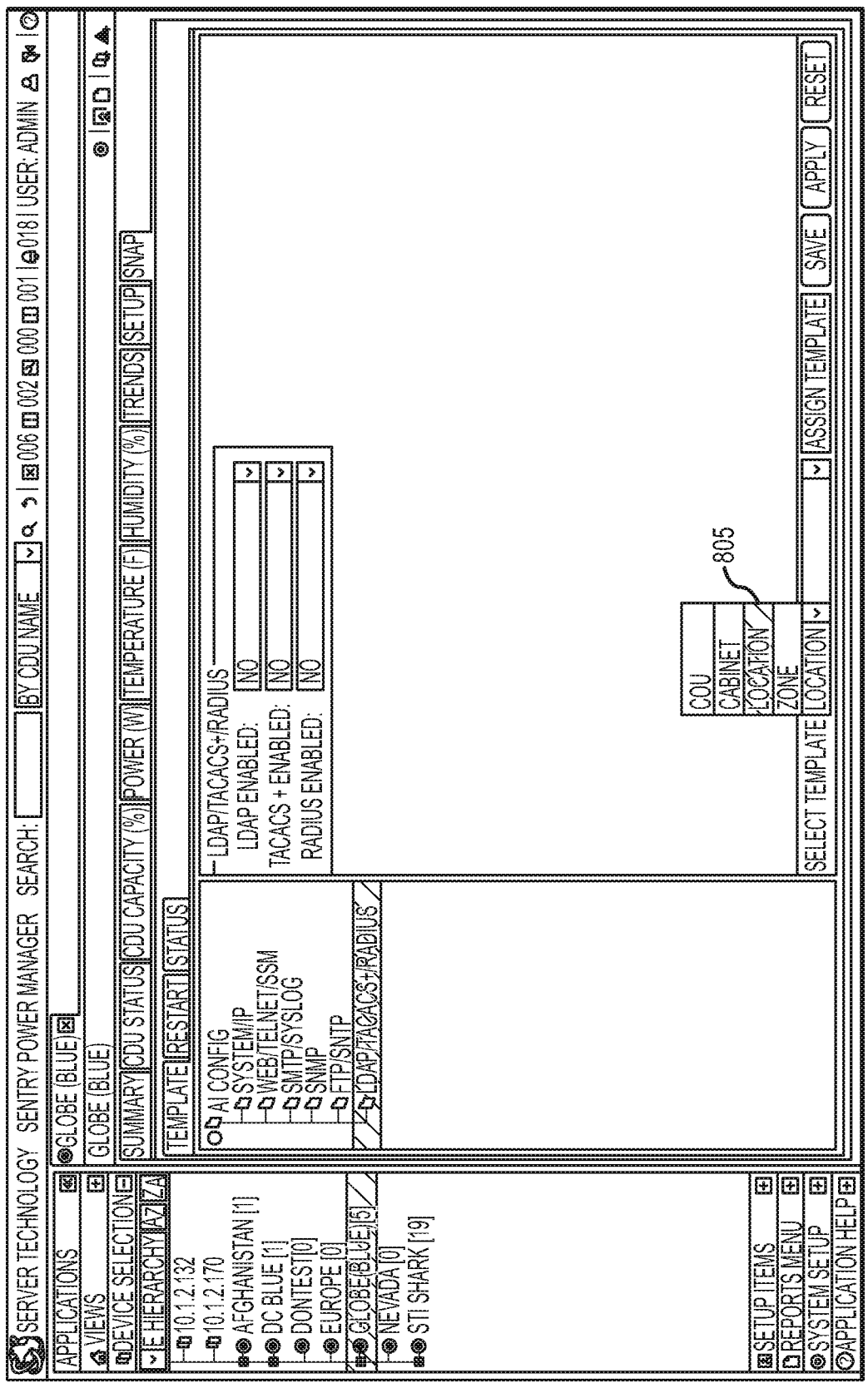
FIG. 8 is an exemplary user interface screen shot for setting device configuration information according to an embodiment.

In the example of FIG. 7, the beginning IP address 710 and ending IP address 715 are determined based on IP addresses that may be assigned from a DHCP server, and are known to personnel operating the power manager application. For example, a network administrator may know that devices within a certain location, or zone within a location, will have IP addresses within a certain range of IP addresses that are assigned by a DHCP server located within that location or zone. Discovery properties, including public/private availability of a get community 720 and a set community 725 are also provided in the discovery settings. In some embodiments, discovery settings may also include username information, an authentication pass phrase, and/or a privacy pass phrase. The particular discovery settings may be selected based on a version of SNMP that is used in the system, as well as the security requirements for particular users. Get community properties 720 relate to the public or private availability of information about the network entity, PDUs in this case, provided in response to a SNMP GET request. Similarly, set community properties 725 relate to the public or private ability to set information for a network entity (PDUs in this case) using a SNMP SET command. A SNAP template 730 may be provided to PDUs discovered in the IP address range, and will be described in more detail below. An option to run discovery now 735 is provided, that may be initiated instead or, or in addition to, periodically scheduled discovery operations. Parent information 740 may also be provided based on the IP address range and knowledge that devices within the begin IP address 710 and ending IP address 715 are associated a particular parent configuration. For example, PDUs may be located in equipment racks in a particular section, or zone, of a location such as a data center, and assigned IP addresses within a known IP address range. Templates may be provided to configure PDUs within different locations, different data centers, zones within (or across) data centers, cabinets, or even for a particular PDU, such as illustrated in the system 800 of FIG. 8, which shows a portion of a configuration template. In this embodiment, a template may be set for the particular location, data center, zone, cabinet, or PDU through selection in a menu 805. Configuration templates will be described in more detail below. A particular zone, for example, may be located within a data center with some configuration items set based on the data center, and other configuration items set based on the section or zone of the data center. Parent information 740, of FIG. 7, may be set to provide both sets of configuration data to PDUs within the data center and section.

Figure 9:
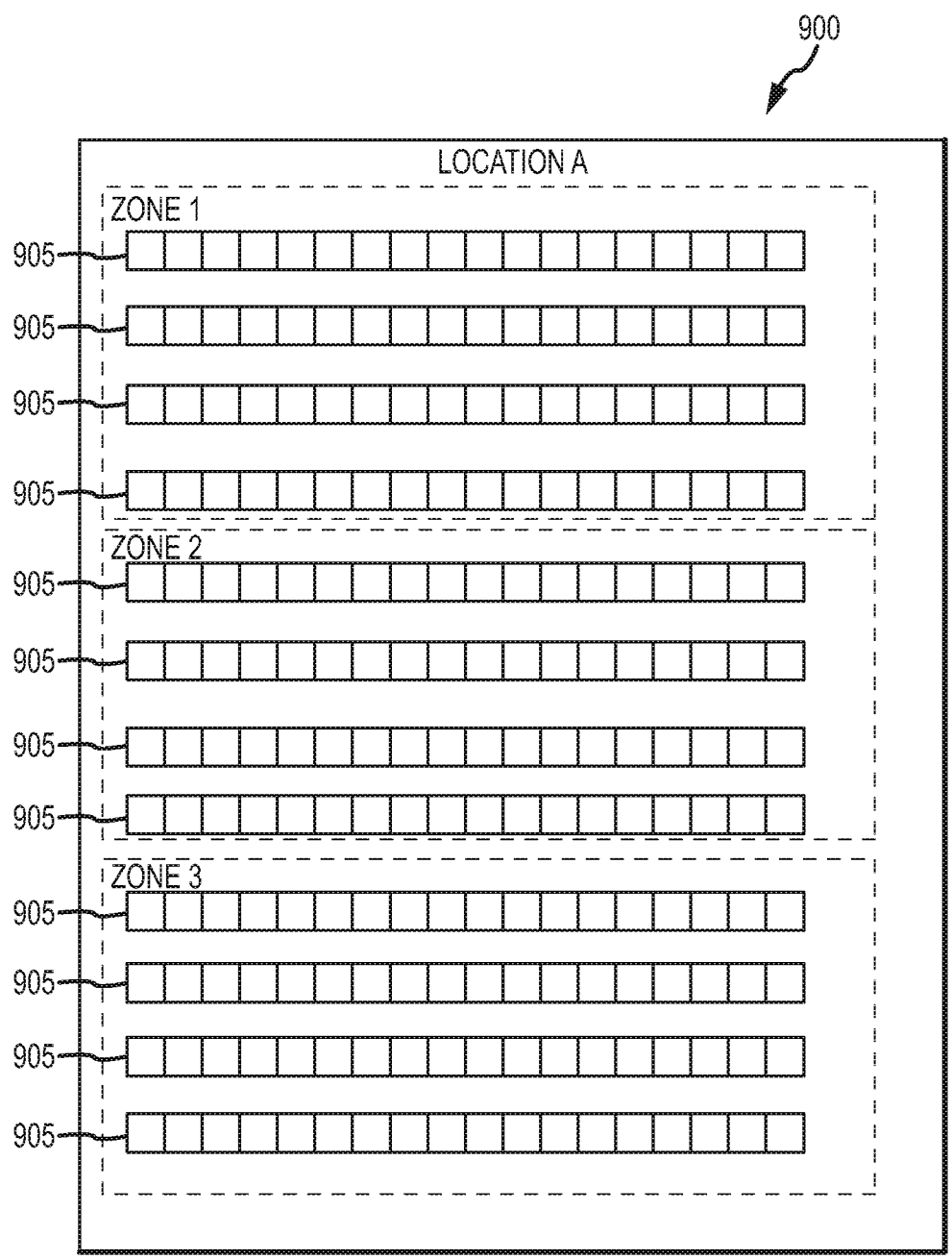
FIG. 9 is an illustration of rows of racks in a data center and different zones that may be defined in the data center according to an embodiment.
Figure 10:
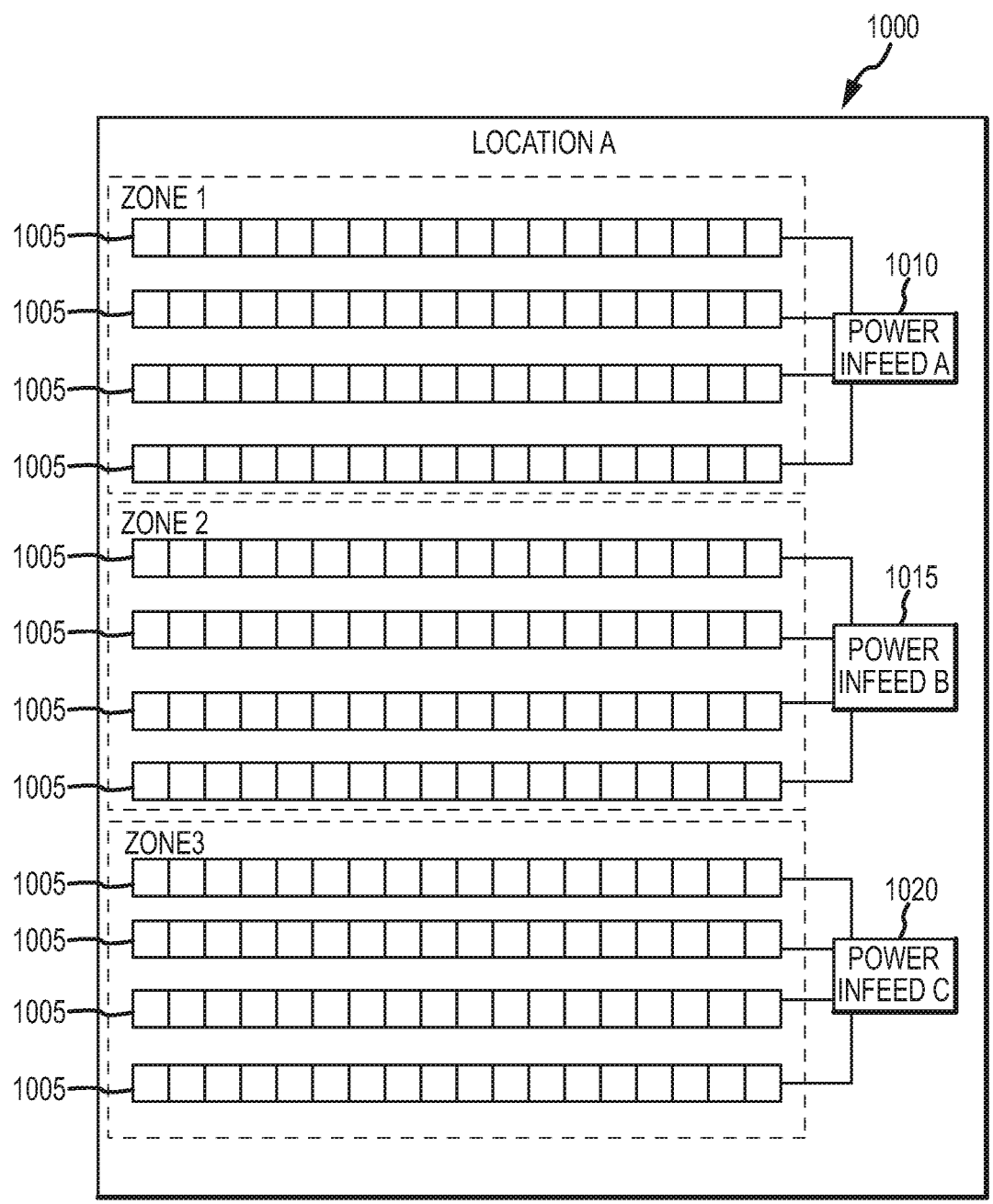
FIG. 10 is an illustration of rows of racks in a data center and different zones that may be defined in the data center according to another embodiment.
Figure 11:
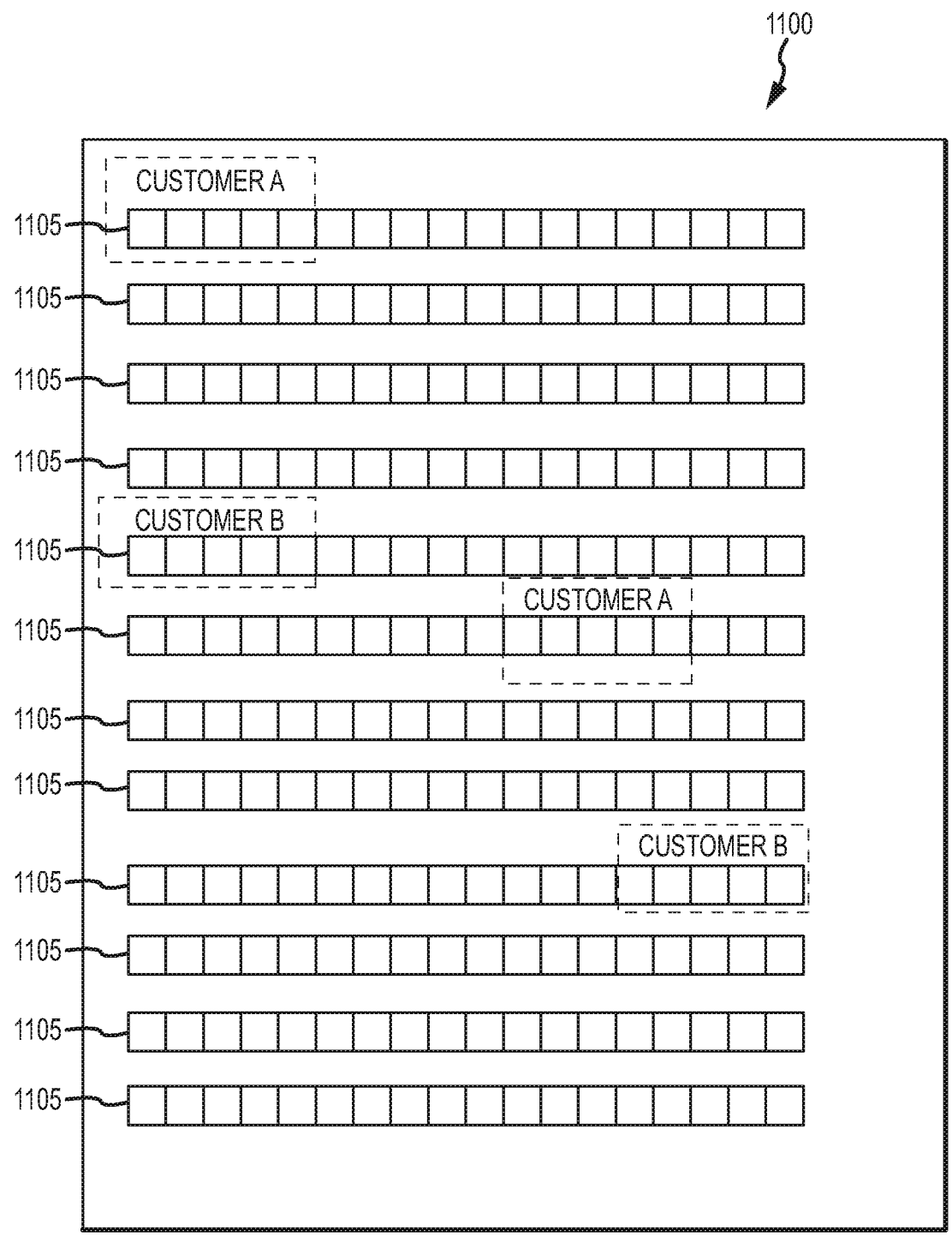
FIG. 11 is an illustration of rows of racks in a data center and different locations of racks that are associated with different data center customers according to an embodiment.

Referring to FIGS. 9-11, of rows 905, 1005, and 1105, respectively, of equipment cabinets may be provided in data centers 900, 1000, and 1100. In various embodiments, configuration templates may be defined for all PDUs for a location, such as all data centers in a particular area, or for PDUs located within certain areas of a data center, for example. Templates may also be defined based on other criteria, such as PDUs of a particular customer, PDUs providing power to different types of equipment, and PDUs having particular physical attributes (such as three-phase power input), to name but a few examples.

With continuing reference to FIGS. 9-11, each cabinet may contain one or more PDUs, as is well understood. A PDU may be located within a data center, such as Location A of FIGS. 9 and 10. Such a data center may include a number of different zones, such as Zones 1, 2, and 3 in data center 900 of FIG. 9. The different zones may require different configurations for any of a variety of reasons, such as the types of equipment located in cabinets in different areas of a data center (e.g., network attached storage may be in one area, and servers may be in another area). In some cases, configurations may be nested, meaning that, for example, a particular data center 900 may have certain global configuration information for all PDUs located within the data center, and particular zones, such as zones 1, 2, and 3, within the data center 900 may have configuration information specific to the particular zone.

Different locations may also have different configurations when information related to power infeeds is included in the configuration data. For example, as illustrated in FIG. 10, utility power may be provided to a data center 1000 through multiple utility power drops and routed to different power infeeds, such as power infeed A 1010, power infeed B 1015, and power infeed C 1020. In some embodiments, PDUs can provide information related to power consumption of components that receive power from the PDUs, and associated information related to the power infeed. This information may be aggregated by a remote system to evaluate overall power consumption of a data center, and identify actions that may be taken to enhance the power efficiency for particular power infeeds 1010-1020, or for the data center 1000 as a whole. FIG. 11 illustrates different cabinets within a data center 1100 that may be associated with different customers. In this embodiment, customer A has equipment in a number of different racks, and likewise customer B has equipment in a number of different racks. PDUs located in the racks associated with customer A may receive a first type of configuration, while PDUs located in the racks associated with customer B may receive a second type of configuration. When programming device discovery information, IP address ranges for the different zones or customers may be known. Alternatively, a database containing information related to locations, zones, and/or customers may be provided and used to determine location, zone, and/or customer information.

Figure 12:
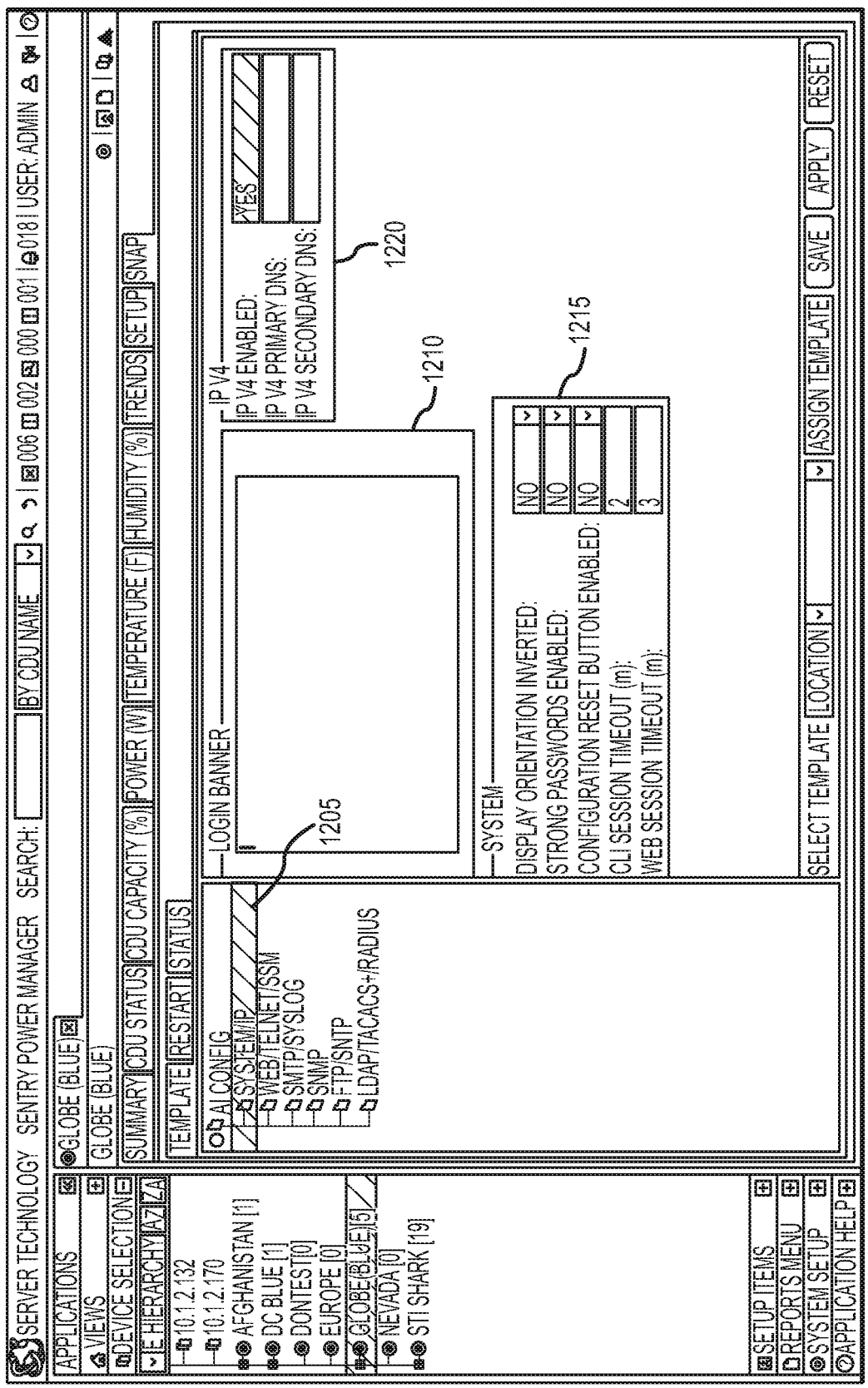
FIGS. 12-17 are illustrations of exemplary configuration setting templates according to an embodiment.
Figure 13:
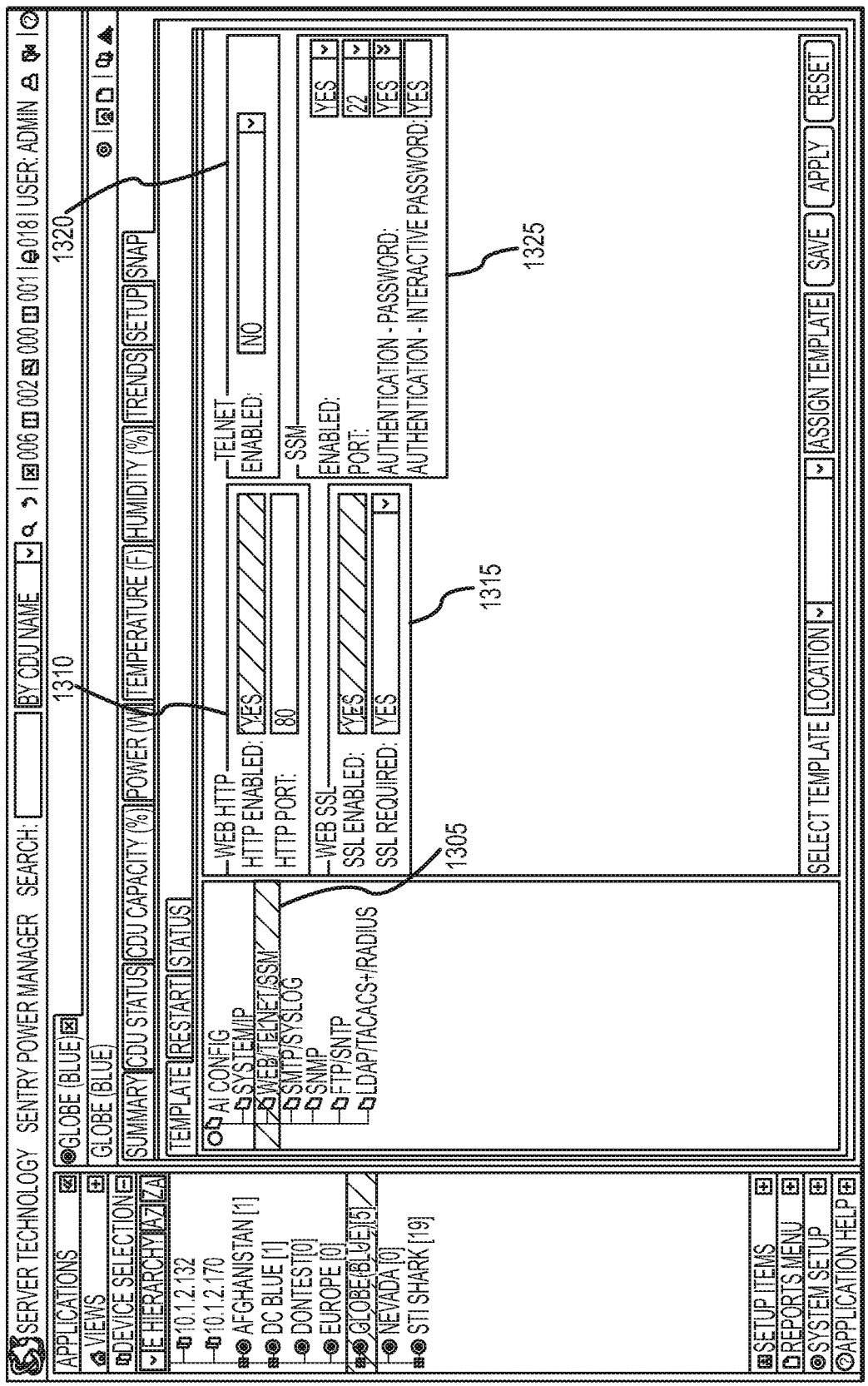
Figure 14:
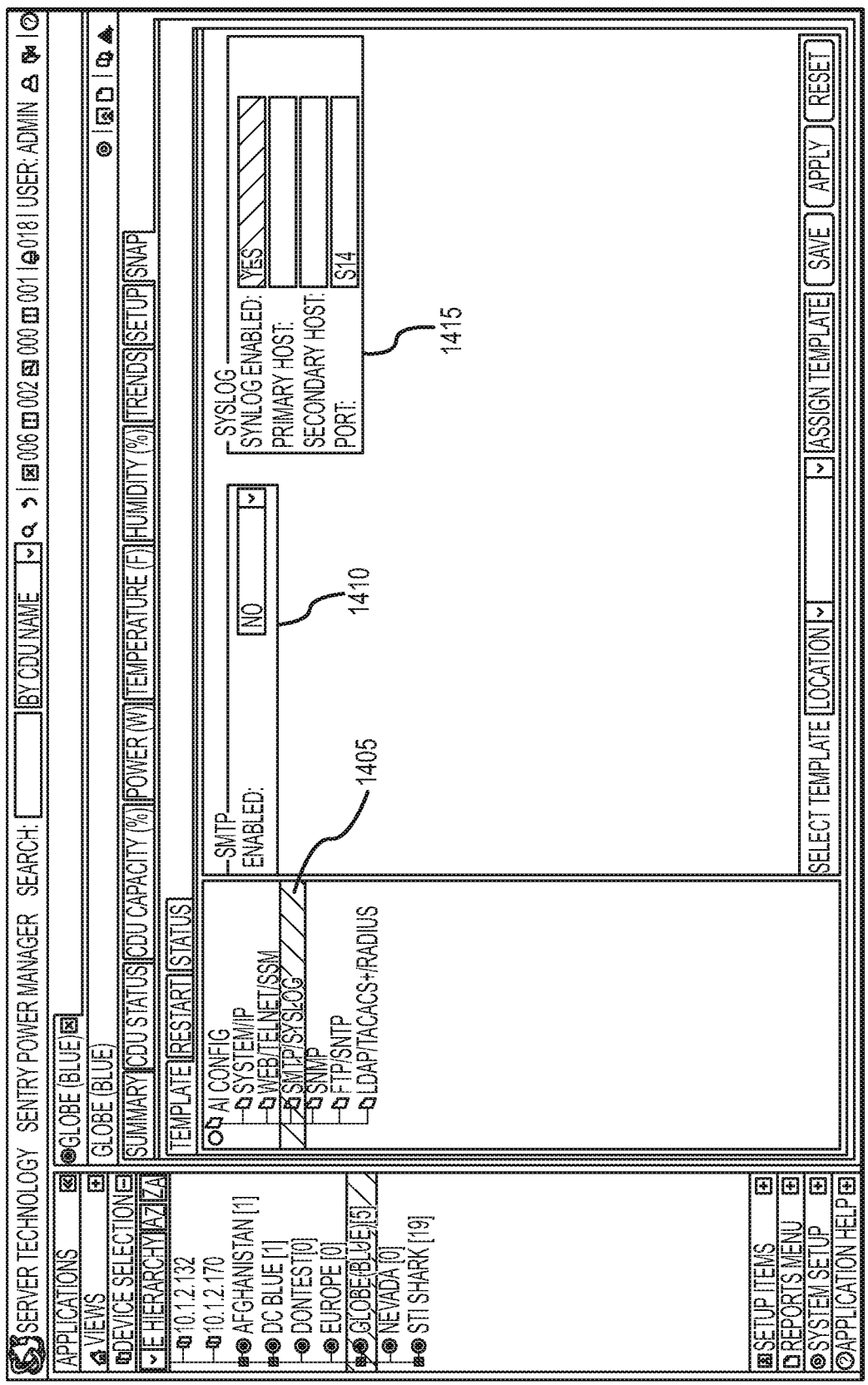
Figure 15:
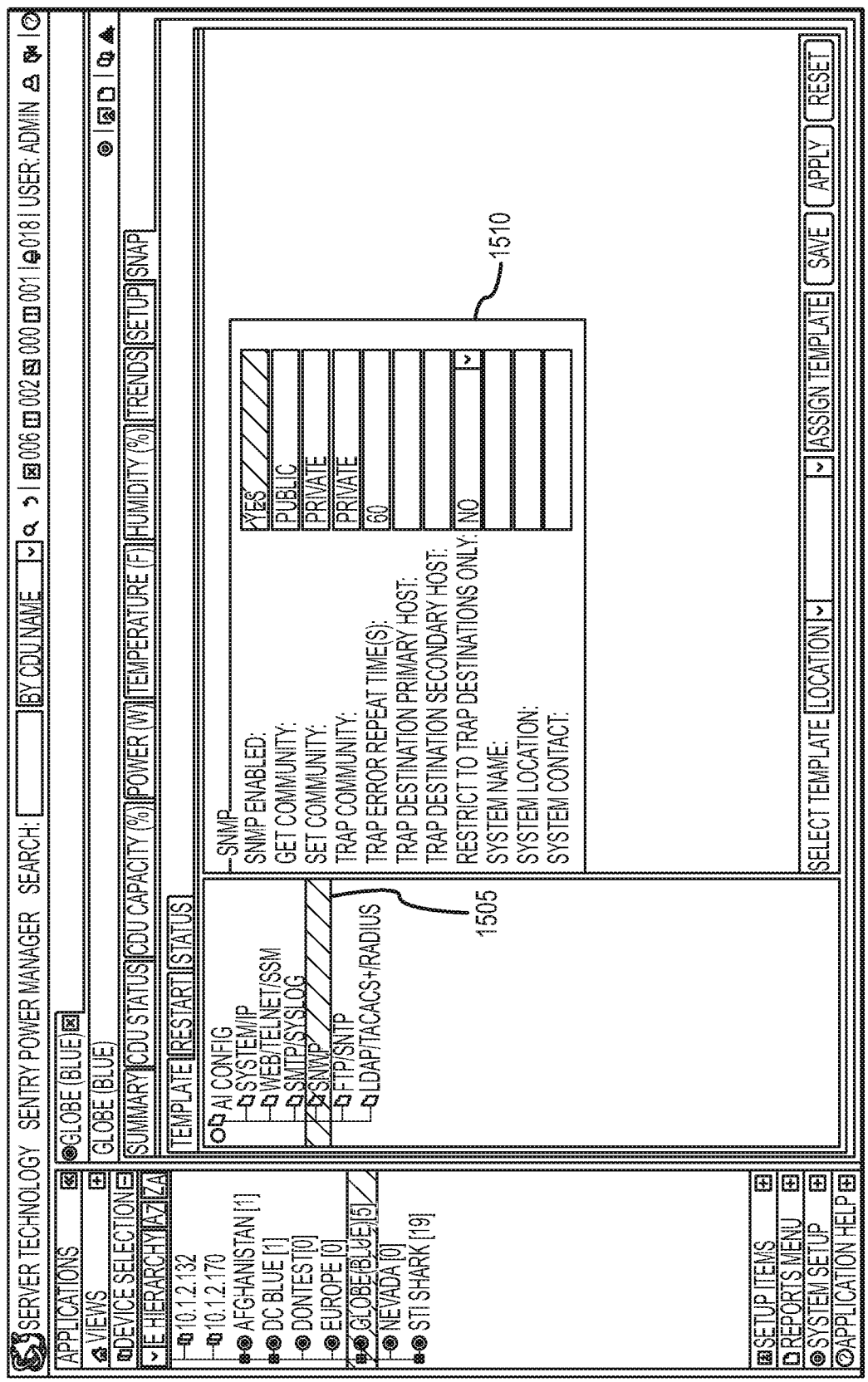
Figure 16:
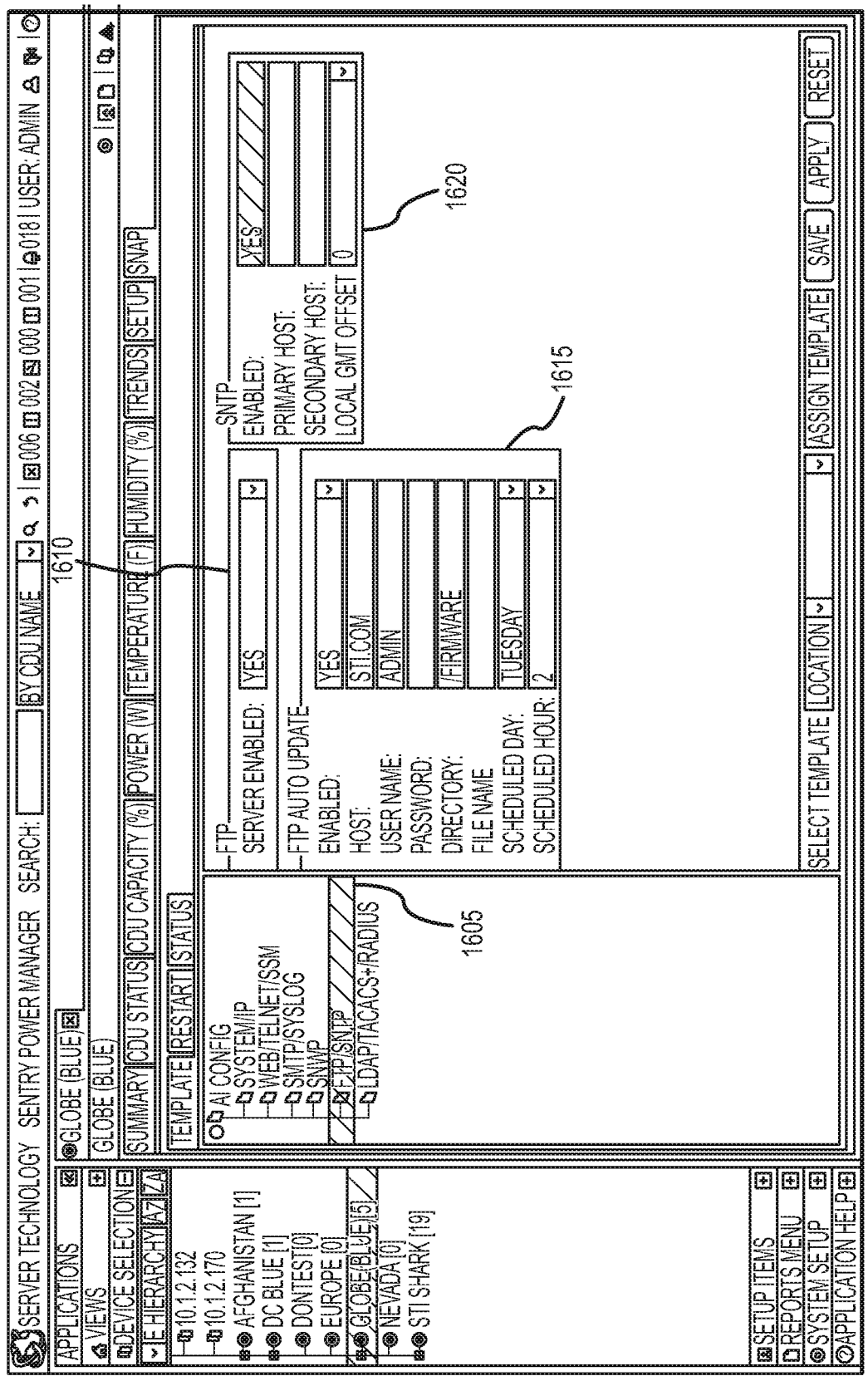
Figure 17:
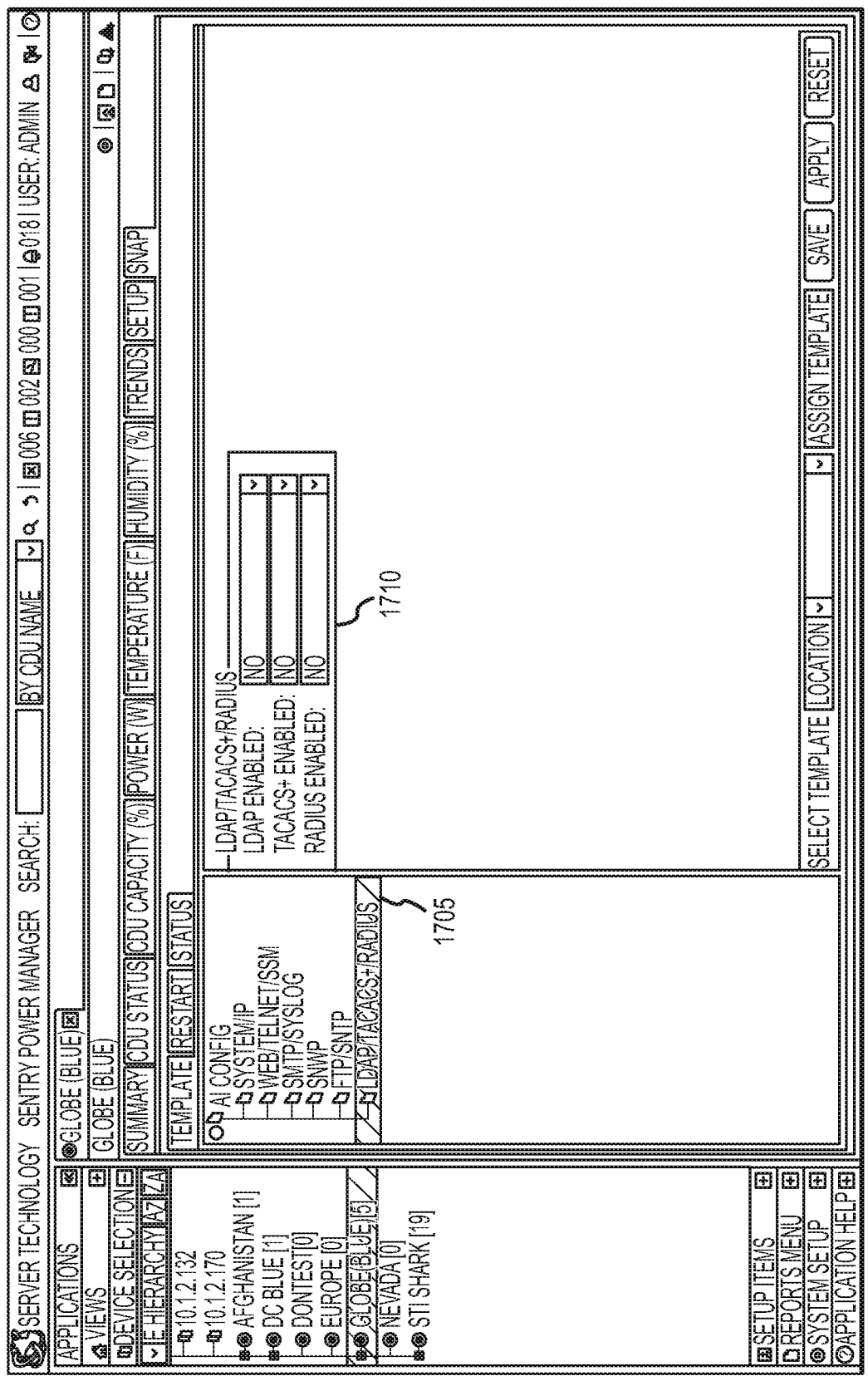

FIGS. 12-17 illustrate screen shots of a different configuration templates 1200-1700 for a power manager server according to an embodiment. In this example, a number of configuration templates 1200-1700 are provided that include various types of configuration information. FIG. 12 includes an example template for System/IP information 1205. This template includes a login banner 1210, which may include information related to a banner that is displayed upon login to the PDU. System information 1215 includes configuration information related to the PDUs associated with the template, and IPV4 information 1220 includes configuration information related to enablement of IPV4 and associated domain name server (DNS) information. FIG. 13 is an exemplary configuration template 1300 for web/telnet/SSH information 1305. This template 1300 includes web HTTP information 1310, web SSL information 1315, telnet information 1320, and SSH information 1325. This information includes whether such features are enabled and related information. FIG. 14 is an exemplary configuration template 1400 for SMTP/Syslog information 1405. This template 1400 includes SMTP information 1410, and Syslog information 1415, regarding whether such features are enabled, and any necessary related information. FIG. 15 is an exemplary configuration template 1500 for SNMP information 1505. This template 1500 includes SNMP information 1510 regarding whether SNMP is enabled, and related information. FIG. 16 is an exemplary configuration template 1600 for FTP and SNTP information 1605. This template 1600 includes FTP server information 1610 regarding whether FTP server capability is enabled, FTP auto update information 1615 regarding whether FTP auto update is enabled, and related information, and SNTP information 1620 regarding whether SNTP is enabled, and related information. FIG. 17 is an exemplary configuration template 1700 for LDAP/TACACS/Radius information 1705. This template 1700 includes LDAP/TACACS/Radius information 1710 regarding whether such features are enabled. As mentioned above, these templates may be saved for a particular location, zone, cabinet, or even PDU. In the event that another PDU in the same location, zone, or cabinet is to be configured, the system discovers the PDU and provides configuration data to the PDU based on the templates that have been set for those particular PDUs. In some instances, a PDU may include a master PDU with an associated link PDU, with both the master PDU and link PDU provided with configuration data using the same configuration templates. As is well understood, a link PDU may be connected to a remote power manager application through the associated master PDU, such link PDUs also sometimes referred to as servant or slave PDUs. In the event that a template is changed, a user may push such a change to a single PDU, or all PDUs associated with the location (e.g., data center, zone, customer, etc.), thus providing for updates to configurations for multiple PDUs in an efficient manner. In some embodiments, when a new or updated template is pushed to PDUs at a location, each PDU provides a real time status as they are updated, and a user may monitor the status of the updates for the PDUs at the associated location.

Figure 18:
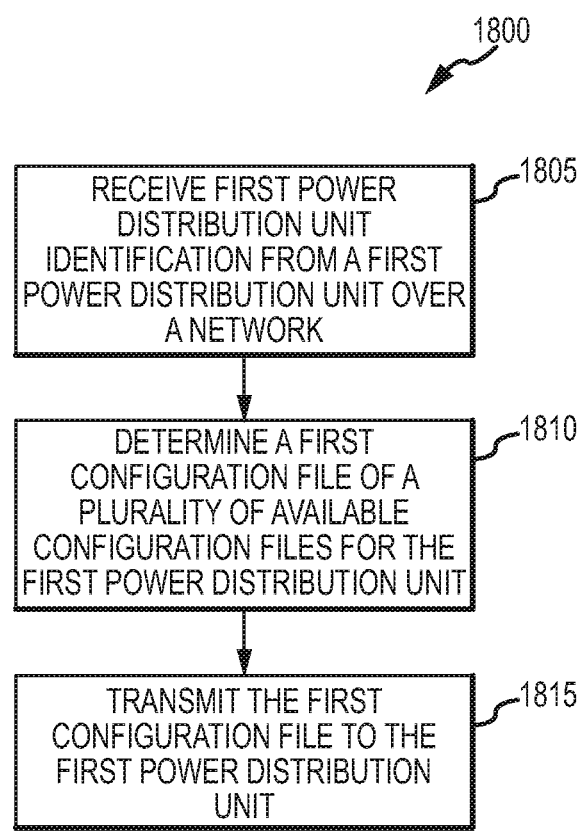
FIG. 18 is a flow chart diagram of operational steps for configuring power distribution units according to an embodiment.

FIG. 18 is a flow chart illustration of the operational steps for providing a configuration file to a PDU, according to an embodiment. In this embodiment, first power distribution unit identification information is received from a first power distribution unit over a network, as indicated at block 1805. At block 1810, a determination is made regarding a first configuration file of a plurality of available configuration files for the first power distribution unit. Such a determination may be made in a manner such as described above, based on location, customer information, etc. The first configuration file is then transmitted to the first power distribution unit at block 1815. After receiving the configuration file, the PDU updates operating parameters and operates according to the first configuration file.

Figure 19:
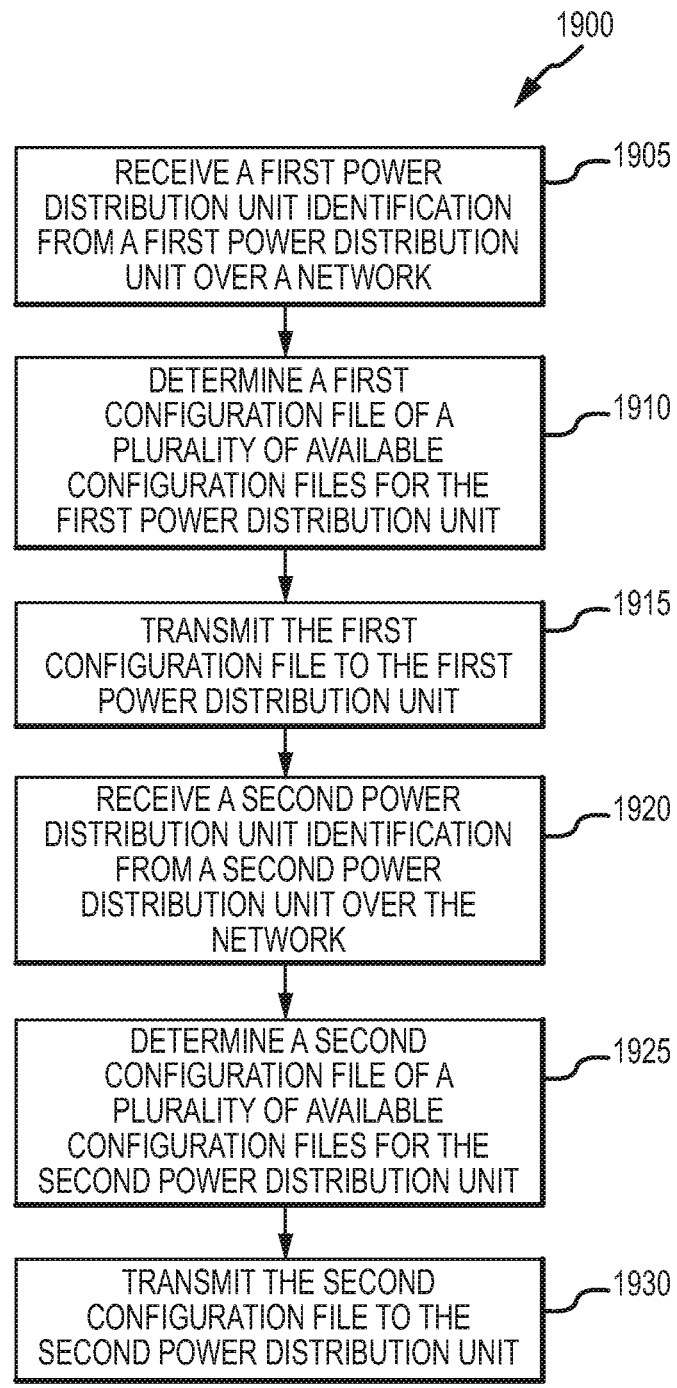
FIG. 19 is a flow chart diagram of operational steps for configuring power distribution units according to another embodiment

As mentioned above, different configuration files may be provided to different PDUs according to one of a number of criteria, such as PDU location, PDU customer requirements, power infeed related to a PDU, etc. FIG. 19 is a flow chart illustration of the operational steps according to another embodiment. In this embodiment, first power distribution unit identification information is received from a first power distribution unit over a network, as indicated at block 1905. At block 1910, a determination is made regarding a first configuration file of a plurality of available configuration files for the first power distribution unit. Such a determination may be made in a manner such as described above, based on location, customer information, etc. The first configuration file is then transmitted to the first power distribution unit at block 1915. A second power distribution unit identification information is received from a second power distribution unit over the network, as indicated at block 1920. At block 1925, a determination is made regarding a second configuration file of a plurality of available configuration files for the second power distribution unit. Such a determination may be made in a manner such as described above, based on location, customer information, etc. The second configuration file is then transmitted to the second power distribution unit at block 1930.

As will be recognized, methods and systems such as described herein provide what may be referred to as a "Plug-and-Play" power distribution unit, with the capability to remotely configure multiple PDUs from a single console. A user may simply connect a PDU to the network, "discover" the device using a remote power manager application, and push configuration data across the network and on to the device. Such a system may save hundreds of hours in PDU configuration time by eliminating or significantly reducing the need for a user to individually initiate configurations and updates for each PDU that is to be configured or updated. Additionally, a user of such a system may, according to some embodiments, instruct single or groups of PDUs, automatically or manually, to download and install the updated product firmware, making firmware version management across numerous PDUs a more manageable task.

According to one exemplary embodiment, a web interface connects remote power management software with PDUs. This protocol runs over a secure HTTPS session and may be initiated through any HttpRequest, script or method that uses standard Get/Post commands. Once HTTPS authentication has been verified, remote power manager communication is initiated by sending a specific URL, unique id and command followed by an optional set of unique tag-value (TV) pairs separated by "&". The unique id may be used by the remote power manager to facilitate identification of the data from the device, and verify to the correct set of information is being communicated. The unique id may be, for example, a time stamp. The message is intercepted by the PDU, which either sets or returns configuration information in TV pairs. Read operations (get or list), according to this embodiment, use the GET method for obtaining data from the PDU. In this case, a unique id, action command and any additional TV tags must be appended to the URL using the "?" separator. Write operations (set) use the POST method to store configuration information in the PDU. In this case, the unique id, command and additional TV pairs are placed in a post buffer. Data will be returned like any standard page request in TV format beginning with the same unique id, a response message and any TV pairs returned or requested. In one embodiment, access requires that authorization credentials be sent for all HTTPS requests using standard base 64 "<user>:<password>" encoding. Tag-Value (TV) pairs may contain a hex tag identifier followed by a separator and data which uses RFC 1738 URL safe encoding. The tag may be, for example, 3-4 characters and structured in a separate class and index portion. Though not in a human readable form, such a structure is more scalable, routable, and easier to validate in software on both server and client ends. Such systems provide simplicity for generating small and powerful configuration commands.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a SIM card, other smart cards, and various other mediums capable of storing, containing or carrying instructions or data.

Furthermore, embodiments may be implemented by hardware, software, firmware, middleware, microcode, hardware description languages, or any combination thereof When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A power distribution apparatus composed of an array of AC power outlets, the power distribution apparatus comprising:
   an elongate housing mountable within a server rack in a data center, said elongate housing having a power input at one end portion for supplying AC-operating power and a network interface configured to electronically communicate with a remote system;
   a plurality of AC power outlets longitudinally disposed along a face of the housing, each connectable in power supply communication with the power input and at least one electronic appliance;
   a memory disposed in the power distribution apparatus including configuration data accessible by the remote system through the network interface, the configuration data corresponding to operating parameters of the power distribution apparatus;
   power distribution apparatus identification data stored in the memory, the power distribution apparatus identifier comprising data usable to identify a location of the power distribution apparatus; and
   a configuration transfer mechanism in two-way communication with the remote system and configured to provide the power distribution apparatus identification data to the remote system and receive the configuration data, in response to providing the power distribution apparatus identification data.

2. The apparatus of claim 1, wherein the configuration data comprises information related to one or more of: a login banner, HTTP settings, Telnet settings, SSH settings, SNTP settings, SSL settings, SMTP settings, SNMP settings, ftp settings, LDAP settings, Radius settings, TACACS+ settings, user and user group definitions and permissions, or outlet group configurations.

3. The apparatus of claim 1, further comprising:
   a plurality of power-control relays disposed in the power-distribution apparatus housing in power control communication with at least one among the plurality of AC power outlets.

4. The apparatus of claim 1, wherein the configuration transfer mechanism comprises a TCP/IP conversion agent in TCP/IP communication with the remote system through the network interface.

5. The apparatus of claim 1, wherein the power distribution apparatus identification data comprises a network identifier indicative of a location of the power distribution apparatus.

6. The apparatus of claim 5, wherein the network identifier indicates the data center.

7. The apparatus of claim 5, wherein the network identifier indicates a location within the data center.

8. The apparatus of claim 1, wherein the power distribution apparatus identification data comprises an Internet Protocol (IP) address of the power distribution apparatus.

9. The apparatus of claim 1, wherein the power distribution apparatus identifier comprises a network identifier and information related to a user of the apparatus.

10. The apparatus of claim 1, further comprising:
    a configuration substitution command mechanism in communication with the configuration file transfer mechanism, whereby the configuration substitution command mechanism is configured to recognize a command to download substitute configuration data to the memory from a remote system.

11. The apparatus of claim 1, wherein the configuration transfer mechanism is programmed to detect errors in transfer of the configuration data between the memory and remote system.

12. The apparatus of claim 1, wherein the configuration transfer mechanism comprises a web page generator that communicates with the remote system.

13. The apparatus of claim 1, wherein the configuration data comprises information related to one or more of: on-off parameters for a subset of the plurality of outlets, or alarm threshold parameters.

14. The apparatus of claim 1, wherein the configuration data comprises data corresponding to a power infeed associated with one or more of the AC power outlets.

15. The apparatus of claim 14, wherein the configuration data further comprises data corresponding to a utility power source associated with one or more of the AC power outlets.

16. The apparatus of claim 1 wherein said plurality of AC power outlets are independently controllable by the remote system located external to the power distribution apparatus.

* * * * *